United States Patent
Kubo

(10) Patent No.: US 11,630,364 B2
(45) Date of Patent: Apr. 18, 2023

(54) ELECTROCHROMIC ELEMENT, OPTICAL APPARATUS, LIGHT CONTROL WINDOW, AND IMAGE PICKUP APPARATUS

(71) Applicant: CANON KABUSHIKI KAISHA, Tokyo (JP)

(72) Inventor: Wataru Kubo, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/923,580

(22) Filed: Jul. 8, 2020

(65) Prior Publication Data

US 2021/0011351 A1    Jan. 14, 2021

(30) Foreign Application Priority Data

Jul. 12, 2019    (JP) .............. JP2019-130177

(51) Int. Cl.
*G02F 1/1514*    (2019.01)
*G02F 1/1516*    (2019.01)

(52) U.S. Cl.
CPC .......... *G02F 1/1514* (2019.01); *G02F 1/1516* (2019.01); *G02F 2001/15145* (2019.01)

(58) Field of Classification Search
CPC ................. G02F 1/1514; G02F 1/1516; G02F 2001/15145; G03B 15/02
USPC ..................................................... 396/155
See application file for complete search history.

(56) References Cited

U.S. PATENT DOCUMENTS

| | | | | |
|---|---|---|---|---|
| 5,768,004 A * | 6/1998 | Cogan | ................... | G02F 1/1524 359/269 |
| 6,020,987 A * | 2/2000 | Baumann | .......... | B32B 17/10513 359/273 |
| 6,249,369 B1 * | 6/2001 | Theiste | .................... | C09K 9/02 359/265 |
| 6,643,050 B2 * | 11/2003 | Rukavina | .............. | G02F 1/1533 359/265 |
| 7,030,916 B2 * | 4/2006 | Aotsuka | ............ | H01L 27/14621 348/226.1 |
| 7,656,458 B2 * | 2/2010 | Hoshuyama | ........... | H04N 9/735 348/366 |
| 2002/0051278 A1 * | 5/2002 | Byker | .................. | C07D 241/36 359/265 |
| 2011/0149248 A1 * | 6/2011 | Ley | ....................... | G03B 15/06 352/43 |
| 2017/0242314 A1 * | 8/2017 | Kubo | .................... | E06B 3/6722 |
| 2017/0313934 A1 * | 11/2017 | Yamada | ................ | E06B 3/6722 |
| 2018/0052375 A1 * | 2/2018 | Yamada | ................ | G02F 1/1503 |
| 2020/0233277 A1 * | 7/2020 | Kubo | ....................... | C09K 9/02 |

FOREIGN PATENT DOCUMENTS

| | | | |
|---|---|---|---|
| JP | 10-138832 A | 5/1998 | |
| JP | 6012689 B2 | 10/2016 | |
| JP | 2017-165708 A | 9/2017 | |
| JP | 2019070789 A * | 5/2019 | ....... B32B 17/10513 |

* cited by examiner

*Primary Examiner* — George G. King
(74) *Attorney, Agent, or Firm* — Canon U.S.A., Inc., IP Division

(57) ABSTRACT

An EC element whose coloring unevenness due to concentration unevenness is reduced by bringing the ratio of red and green wavelength ranges of a colored form of an anodic EC compound close to the ratio of red and green wavelength ranges of a colored form of a cathodic EC compound.

12 Claims, 13 Drawing Sheets

Prior Art

Prior Art

Prior Art

ELECTROCHROMIC ELEMENT, OPTICAL APPARATUS, LIGHT CONTROL WINDOW, AND IMAGE PICKUP APPARATUS

BACKGROUND OF THE INVENTION

Field of the Invention

The present disclosure relates to an electrochromic element that adjusts the amounts of reflected light and transmitted light, an optical apparatus including the element, a light control window including the element, and an image pickup apparatus including the element.

Description of the Related Art

Compounds whose optical characteristics (e.g., absorption wavelength and absorbance) change through electrochemical redox reactions are referred to as electrochromic (EC) compounds. EC elements in which EC compounds are used have been used, for example, in display apparatuses, reflectance-variable mirrors, and transmittance-variable windows.

In some EC elements, a solution layer containing an anodic EC compound that is colored or decolored through oxidation and a cathodic EC compound that is colored or decolored through reduction is used as an EC layer. Such EC elements are called complementary EC elements. A complementary EC element has the advantage of being able to show an increased contrast of coloration and decoloration because coloration and decoloration of both an anodic EC compound and a cathodic EC compound contributes to coloration and decoloration of the EC element. On the other hand, if variation in concentration between the anodic EC compound and the cathodic EC compound occurs at a part of the EC element, a state in which the color of the part is different from that of the other part will occur. For example, when the complementary EC element is driven for a long time in a standing position such that the plane direction of a pair of electrodes between which an EC layer is sandwiched is parallel to the vertical direction, a phenomenon (segregation) may occur in which the anodic EC compound and the cathodic EC compound are vertically separated from each other in the EC layer. If segregation occurs, color components that make up the color of the colored EC element may be separated from each other to cause color unevenness in the plane between the upper side and the lower side in the vertical direction (vertical color separation). For an apparatus in which an EC element is used as a light control element, the occurrence of such color unevenness is not preferred because the quality of the apparatus is degraded.

Japanese Patent Laid-Open No. 10-138832 discloses an EC element in which the occurrence of color unevenness is reduced by using a thickener. The thickener increases the viscosity of a solution containing an EC compound to reduce migration of materials in the solution.

However, if the viscosity of a solution containing an EC compound is increased as in Japanese Patent Laid-Open No. 10-138832, migration of materials is reduced also when a colored state of an EC element is changed, and thus an excessively increased viscosity may decrease the response speed of the EC element. In addition, for example, when the EC element was driven for a long time at a high coloring concentration, only increasing the viscosity of the EC layer was sometimes insufficient to reduce color unevenness.

SUMMARY OF THE INVENTION

The present disclosure reduces color unevenness in a complementary EC element without decreasing its response speed.

The present disclosure provides an electrochromic element including a first electrode, a second electrode, and an electrochromic layer disposed between the first electrode and the second electrode. The electrochromic layer contains a solvent, an anodic electrochromic compound, and a cathodic electrochromic compound. When a variable transmittance of the anodic electrochromic compound is $VT_A(\lambda)$, and a variable transmittance of the cathodic electrochromic compound is $VT_C(\lambda)$, the variable transmittances being obtained when light is incident on the electrochromic element, and among signal strengths based on light passing through the electrochromic element and detection sensitivity, contributions of $VT_A(\lambda)$ in red and green wavelength ranges are $S_{RA}$ and $S_{GA}$, and contributions of $VT_C(\lambda)$ in the red and green wavelength ranges are $S_{RC}$ and $S_{GC}$, $R_{RGAC}$ expressed as $R_{RGAC}=(S_{RA}/S_{GA})/(S_{RC}/S_{GC})$ satisfies $0.59 \leq R_{RGAC} \leq 1.78$.

Further features of the present disclosure will become apparent from the following description of exemplary embodiments with reference to the attached drawings.

DESCRIPTION OF THE EMBODIMENTS

Hereinafter, embodiments of the present disclosure will be described with reference to the drawings. It should be noted that the present disclosure is not limited to the following embodiments. Variations and modifications may be appropriately made to the following embodiments based on common knowledge of those skilled in the art without departing from the spirit of the present disclosure, and such varied and modified embodiments are also encompassed within the scope of the present disclosure.

Optical Apparatus Including EC Element

Figure 1:
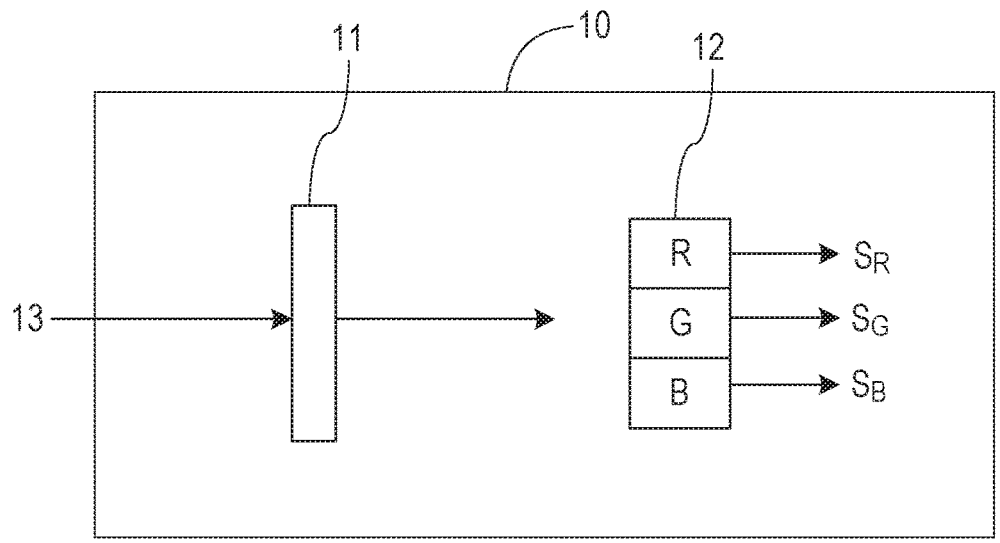
FIG. 1 is a cross-sectional view schematically illustrating a basic configuration of an EC element.

FIG. 1 is a schematic view illustrating an example of an optical apparatus including an electrochromic element (EC element) of the present disclosure. In FIG. 1, an optical apparatus 10 includes an EC element 11 and a photodetector 12 (e.g., an image pickup element) that has a plurality of detection light wavelength ranges such as red (R), green (G), and blue (B). Incident light 13 passes through the EC element 11 and enters the photodetector 12 to give signals $S_R$, $S_G$, and $S_B$ corresponding to the R range, the G range, and the B range, respectively. Examples of the EC element 11 of the present disclosure include optical filters (e.g., ND filters), transmittance-variable windows (light control windows), transmittance-variable glasses, and reflectance-variable mirrors. One specific example of the optical apparatus illustrated in FIG. 1 is a camera system (including a camera and lenses) equipped with an optical filter.

EC Element

The EC element 11 is a device that introduces light from the outside and allows the introduced light to pass through at least a part of an electrochromic layer (EC layer) to thereby change characteristics of outgoing light, typically, light intensity, from those of incident light in a predetermined wavelength range.

Figure 2:
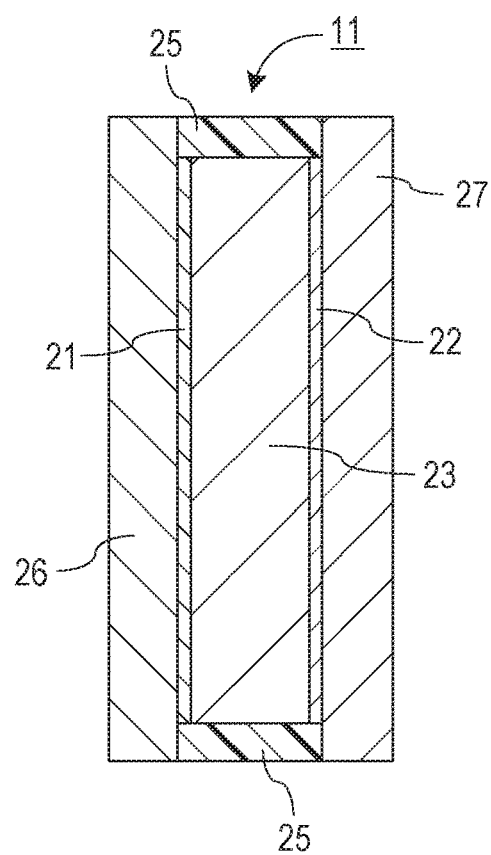
FIG. 2 schematically illustrates a configuration of a system for determining a variable transmittance and a spectral sensitivity of an EC element.

FIG. 2 is a cross-sectional view schematically illustrating a basic configuration of the EC element 11. The EC element 11 in this embodiment includes a first electrode 21, a second electrode 22, and an EC layer 23 disposed between the first electrode 21 and the second electrode 22. The EC element 11 may also include a first substrate 26, a second substrate 27, and a sealing member 25. The EC layer 23 contains a solvent, an anodic electrochromic compound (anodic EC compound), and a cathodic electrochromic compound (cathodic EC compound).

The EC element 11 in FIG. 2 is an example of the EC element of the present disclosure, and the EC element of the present disclosure is not limited thereto. For example, a layer of antireflection coating may be disposed between the substrate and the electrode or between the electrode and the EC layer.

Hereinafter, components of the EC element 11 will each be described.

Substrate

For the substrates 26 and 27, when the EC element 11 is transmissive, both the substrates need to be transparent substrates, and when the EC element 11 is reflective, at least the substrate on which light is incident and from which light is emitted needs to be a transparent substrate. The term "transparent" here means that the transmittance of light is 50% or more and 100% or less, more preferably 70% or more and 100% or less. As used herein, the term "light" means light in a wavelength range used in the EC element. For example, when the EC element 11 is used as an optical filter for a visible-range image pickup apparatus, light means light in the visible range, and when the EC element 11 is used as an optical filter for an infrared-range image pickup apparatus, light means light in the infrared range.

Specifically, the substrates 26 and 27 may be made of a colorless or colored glass or a transparent resin. Examples of glasses include optical glass, quartz glass, super white glass, soda-lime glass, borosilicate glass, alkali-free glass, and chemically strengthened glass. Examples of transparent resins include polyethylene terephthalate, polyethylene naphthalate, polynorbornene, polyamide, polysulfone, polyether sulfone, polyether ether ketone, polyphenylene sulfide, polycarbonate, polyimide, and polymethyl methacrylate. When a non-transparent substrate is used, there is no particular limitation as long as the substrate has insulating characteristics.

Electrode

The electrodes 21 and 22 may be composed of a material that is stably present in an operating environment of the EC element 11 and that can immediately cause a redox reaction in response to application of voltage from the outside. The component material of the electrodes 21 and 22 may be, for example, a light-transmitting electroconductive material or a metal described later.

At least one of the electrodes 21 and 22 may be a light-transmitting electrode. The term "light-transmitting" here means that the transmittance of light is 50% or more and 100% or less. When at least one of the electrodes 21 and 22 is a light-transmitting electrode, light can be efficiently introduced into the EC element 11 from the outside and interacted with EC compounds in the EC layer 23, thereby reflecting optical characteristics of the EC compounds on outgoing light.

The light-transmitting electrode may be, for example, a film formed of a light-transmitting electroconductive material on a substrate or a light-transmitting electrode including a transparent substrate and a metal wire partially disposed thereon. Here, an electrode including a metal wire that is not transparent but that is disposed partially so that the transmittance of light is in the above range is called a light-transmitting electrode in the present disclosure.

Examples of light-transmitting electroconductive materials include light-transmitting electroconductive oxides and carbon materials such as carbon nanotubes. Examples of light-transmitting electroconductive oxides include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Of these, ITO or FTO is preferred.

When the electrodes are each formed of a light-transmitting electroconductive oxide, the thickness of each electrode may be 10 nm or more and 10 μm or less. In particular, when an ITO or FTO film formed to have a thickness of 10 nm or more and 10 μm or less is used as the electrodes, both high transmittance and chemical stability can be achieved.

When the electrodes are each formed of a light-transmitting electroconductive oxide, each electrode may have a structure in which sublayers of the light-transmitting electroconductive oxide are stacked on top of each other. This allows high conductivity and high transparency to be easily achieved.

The metal used as a component material of each electrode is not particularly limited, and electrochemically stable metals, such as silver (Ag), gold (Au), platinum (Pt), and titanium (Ti), may be used. The metal wire may be disposed in a grid pattern. The electrode provided with the metal wire is typically a flat electrode but may optionally be a curved one.

As described above, at least one of the electrodes 21 and 22 may be a light-transmitting electrode, but when one of the electrodes is a light-transmitting electrode, the other electrode may be a preferred electrode selected in accordance with an application of the EC element 11. For example, when the EC element 11 is a transmissive EC element, both the electrodes 21 and 22 may be light-transmitting electrodes. When the EC element 11 is a reflective EC element, it is preferred that one of the electrodes 21 and 22 be a light-transmitting electrode and the other be an electrode that reflects light introduced into the EC element 11. Furthermore, by forming a reflection layer or a scattering layer between the electrode 21 and the electrode 22, the degree of freedom of optical characteristics of the other electrode described above can be improved. For example, when a reflection layer or a scattering layer is disposed between the electrode 21 and the electrode 22, the other electrode described above may be a non-light-transmitting electrode or an electrode that absorbs light of interest.

For the arrangement of the electrodes 21 and 22, a commonly known electrode arrangement for the EC element 11 can be used. Typically, for example, the first electrode 21 formed on the first substrate 26 and the second electrode 22 formed on the second substrate 27 may be disposed so as to face each other with the EC layer 23 interposed between the electrodes 21 and 22. In this case, the distance (interelectrode distance) between the electrodes 21 and 22 may be 1 µm or more and 500 µm or less. When the interelectrode distance is large, the thickness of the EC layer 23 can be large, and EC compounds in an amount sufficient for the EC element 11 to function effectively can be present in the EC layer 23. As a result, the transmittance in a colored state can be advantageously further reduced. When the interelectrode distance is small, the response speed of the EC element 11 advantageously tends to be high. As described above, when the interelectrode distance is 1 µm or more and 500 µm or less, low transmittance in a colored state and high responsivity can be easily achieved.

Sealing Member

The sealing member 25 is disposed between the electrodes 21 and 22 and bonds the electrodes 21 and 22 to each other.

The sealing member 25 may be formed of a material that is chemically stable, that is poorly permeable to gas and liquid, and that does not inhibit the redox reaction of EC compounds. For example, inorganic materials such as glass frit, organic materials such as epoxy resins and acrylic resins, and metals can be used. The sealing member may have a function to maintain the distance between the electrodes 21 and 22, for example, by containing a spacer material. In this case, a space for disposing the EC layer 23 between the electrodes 21 and 22 can be created by the electrodes 21 and 22 and the sealing member 25.

When the sealing member 25 does not have a function to determine the distance between the electrodes 21 and 22, a spacer having a function to determine and maintain the distance between the electrodes may be separately disposed to maintain the distance between the electrodes. Examples of materials for the spacer include inorganic materials such as silica beads and fiberglass and organic materials such as polyimide, polytetrafluoroethylene, polydivinylbenzene, fluorocarbon rubber, and epoxy resins.

Electrochromic Layer

The EC layer 23 contains a solvent, an anodic EC compound, and a cathodic EC compound. The EC layer 23 may be a solution layer in which the anodic EC compound and the cathodic EC compound are dissolved in the solvent.

The EC layer 23 may further contain additives such as a supporting electrolyte and a thickener.

Solvent

The solvent can be appropriately selected depending on the intended use in view of, for example, the solubility, vapor pressure, viscosity, and potential window of solutes such as the anodic EC compound and the cathodic EC compound used. The solvent may be capable of dissolving the anodic EC compound and the cathodic EC compound used. The solvent may be a polar solvent. Specific examples include water and organic polar solvents such as ether compounds, nitrile compounds, alcohol compounds, dimethyl sulfoxide, dimethoxyethane, sulfolane, dimethylformamide, dimethylacetamide, and methylpyrrolidinone. Of these, solvents containing cyclic ethers, such as propylene carbonate, ethylene carbonate, γ-butyrolactone, valerolactone, and dioxolane, are preferred. These solvents containing cyclic ethers are preferred from the viewpoint of the solubility, boiling point, vapor pressure, viscosity, and potential window of the EC compounds. Solvents containing propylene carbonate among cyclic ethers are particularly preferred. The solvent may be an ionic liquid.

A polymer, a gelling agent, or a thickener may further be incorporated into the solvent to make the EC layer 23 more viscous or gelatinous. As the solvent or an electrolytic solution, a polymer electrolyte or a gel electrolyte may be used. Examples of polymers include, but are not limited to, polyacrylonitrile, carboxymethylcellulose, polyvinyl chloride, polyethylene oxide, polypropylene oxide, polyurethane, polyacrylate, polymethacrylate, polyamide, polyacrylamide, polyester, Nafion (registered trademark), and derivatives thereof. When the EC layer 23 is made more viscous or gelatinous, migration of the EC compounds in the EC layer 23 is reduced. As a result of this, the occurrence of vertical color separation can be further reduced.

The EC layer 23 may further contain a supporting electrolyte. The supporting electrolyte is not particularly limited as long as it is a salt that dissociates into ions and has good solubility in the solvent. The supporting electrolyte may be a substance stable at an operating potential of the EC element 11. The supporting electrolyte may be a combination of a cation and an anion, each being appropriately selected from various ions. Examples of cations include metal ions such as alkali metal ions and alkaline-earth metal ions and organic ions such as quarternary ammonium ions. Specific examples include $Li^+$, $Na^+$, $K^+$, $Ca^{2+}$, $Ba^{2+}$, tetramethylammonium ion, tetraethylammonium ion, and tetrabutylammonium ion. Examples of anions include anions of fluorine compounds and halide ions. Specific examples include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$. A salt compound may be used as an EC compound to allow the EC compound to also function as a supporting electrolyte. Examples of EC compounds that are also salt compounds include viologen derivatives.

The EC layer 23 may be formed by any method, for example, by injecting a liquid containing a solvent and EC compounds into a space provided between the electrodes 21 and 22, for example, by a vacuum injection method, an atmospheric injection method, or a meniscus method. Specifically, for example, a liquid containing a solvent and EC compounds is injected into a cell formed by the electrodes 21 and 22 and the sealing member 25 through an opening (not illustrated) formed in a part of the electrode 21, the electrode 22, or the sealing member 25, and the opening is sealed with a seal.

EC Compound

As used herein, the term "EC compound" refers to a compound that is a redox substance and whose optical characteristics change through a redox reaction in a light wavelength range of interest of the EC element. The optical characteristics include light absorption characteristics and light reflection characteristics and typically mean light absorption characteristics. The term "redox substance" here means a substance capable of repeatedly undergoing a redox reaction in a predetermined potential range. The EC compound can also be said to be a compound whose light transmittance changes through a redox reaction in a light wavelength range of interest of the EC element. The phrase "optical characteristics change" here typically means that a light absorption state (light reduction state) and a light transmission state are switched to each other. In this case, the EC compound can also be said to be a compound whose light absorption state and light transmission state are switched to each other through a redox reaction.

As used herein, the term "anodic EC compound" refers to an EC compound whose optical characteristics change through an oxidation reaction in a light wavelength range of interest of the EC element when the EC element is driven. In general, the oxidation reaction is a reaction in which an electron is removed from an EC compound. As used herein, the term "cathodic EC compound" refers to an EC compound whose optical characteristics change through a reduction reaction in a light wavelength range of interest of the EC element when the EC element is driven. In general, the reduction reaction is a reaction in which an electron is donated to an EC compound. One typical example of the anodic EC compound is a compound whose state changes from a light transmission state to a light absorption state through an oxidation reaction when the EC element is driven. One typical example of the cathodic EC compound is a compound whose state changes from a light transmission state to a light absorption state through a reduction reaction when the EC element is driven. Alternatively, the anodic EC compound and the cathodic EC compound may each be a compound whose state changes from a light absorption state to a light transmission state through an oxidation reaction or a reduction reaction when the EC element is driven. For a better understanding of the change of the light absorption characteristics of the EC compounds, the following description will be made in the context of a typical example in which the state changes from a light transmission state (decolored state) to a light absorption state (colored state) when the EC element is driven.

By controlling the voltage applied between the electrodes 21 and 22 or switching the EC element on and off, the anodic EC compound and the cathodic EC compound each undergo an oxidation reaction or a reduction reaction to enter at least two states different from each other. Herein, an EC compound in a state of being oxidized through an oxidation reaction of one or more electrons is called an "oxidized form" of the EC compound, and an EC compound in a state of being reduced through a reduction reaction of one or more electrons is called a "reduced form" of the EC compound. That is to say, the anodic EC compound is a reduced form when the EC element is not driven and partly becomes an oxidized form when the EC element is driven. The cathodic EC compound is an oxidized form when the EC element is not driven and partly becomes a reduced form when the EC element is driven.

In some literatures, the state of an EC compound is expressed as changing from an oxidized form to a reduced form (and vice versa) via a neutral form. In the following description, however, oxidized forms and reduced forms are basically described on the basis of the knowledge that a reduced form is formed when an oxidized form is reduced and an oxidized form is formed when a reduced form is oxidized. For example, ferrocene containing divalent iron (neutral as the whole molecule) is a reduced form of ferrocene (an anodic redox substance) when the ferrocene functions as an anodic redox substance. A substance (ferrocenium ion) containing trivalent iron formed as a result of oxidation of the reduced form is an oxidized form, particularly, a first oxidized form of ferrocene (an anodic redox substance). When a dication salt of viologen functions as the cathodic EC compound, the dication salt is an oxidized form of the cathodic EC compound. A monocation salt formed by one-electron reduction of the dication salt is a reduced form, particularly, a first reduced form of the cathodic EC compound.

The EC compounds used in the present disclosure may be organic compounds. The EC compounds may be low-molecular-weight organic compounds or high-molecular-weight organic compounds but are preferably low-molecular-weight organic compounds having a molecular weight of 2000 or less. The anodic EC compound and the cathodic EC compound may each be a compound that is changed from a decolored form to a colored form by driving the EC element. The EC compounds may each include a plurality of anodic EC compounds or a plurality of cathodic EC compounds.

Examples of the anodic EC compound include thiophene derivatives, amines having aromatic rings (e.g., phenazine derivatives and triallylamine derivatives), pyrrole derivatives, thiazine derivatives, triallylmethane derivatives, bisphenylmethane derivatives, xanthene derivatives, fluorane derivatives, and spiropyran derivatives. In particular, the anodic EC compound is preferably a low-molecular amine having an aromatic ring, most preferably a dihydrophenazine derivative.

This is because using these compounds as EC compounds allows an EC element having a desired absorption wavelength profile to be readily provided and the EC element has high durability for repeated use. These compounds, when neutral (reduced form), have an absorption peak in the ultraviolet range and no absorption in the visible range, and thus are in a decolored state where the transmittance in the visible range is high. When these molecules become radical cations (oxidized forms) through oxidation reactions, the absorption peak shifts into the visible range, and the molecules enter a colored state. The absorption wavelength of these molecules can be freely designed by increasing or decreasing their n-conjugation length or by changing a substituent to alter the n-conjugated system. Being low-molecular means having a molecular weight of 2000 or less (when the EC compounds are ionic compounds, the molecular weight of counterions of the EC compounds is not included).

Examples of the cathodic EC compound include, but are not limited to, pyridine derivatives such as viologen derivatives and quinone compounds. Of these, pyridine derivatives such as viologen derivatives are most preferably used.

Therefore, the cathodic EC compound is preferably a compound having a pyridine skeleton or a quinone skeleton. The cathodic EC compound is more preferably a compound represented by formula (1) below.

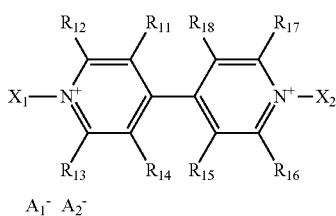

(1)

In formula (1) above, $X_1$ and $X_2$ are each independently selected from an alkyl group, an aralkyl group, and an aryl group. The alkyl group, the aralkyl group, and the aryl group are optionally substituted. $R_{11}$ to $R_{18}$ are each independently any one of a hydrogen atom, an alkyl group, an aralkyl group, an alkoxy group, an aryl group, a heterocyclic group, a substituted amino group, a halogen atom, and an acyl group. The alkyl group, the alkoxy group, the aralkyl group, the aryl group, and the heterocyclic group are optionally substituted. $A_1^-$ and $A_2^-$ each independently represent a monovalent anion.

Principle of Formation of Color Unevenness in Complementary EC Element and Typical Profile Thereof The present inventors have repeatedly observed, measured, and analyzed color unevenness that develops in a complementary EC element to thereby elucidate the major cause thereof. Color unevenness in a complementary EC element often develops due to the following two reasons.
(1) The concentration ratio of a colored form of an anodic EC compound to a colored form of a cathodic EC compound, the colored forms both absorbing light in an EC layer, shifts from a predetermined concentration ratio (typically, an isoconcentration ratio).
(2) The colored forms of the anodic EC compound and the cathodic EC compound have different colors.

Here, vertical color separation, which is typical color unevenness, was caused to occur in an EC element. As an EC layer, a solution obtained by dissolving compound 2 represented by formula (1) below and compound 3 represented by formula (3) below, which are typical EC compounds, in propylene carbonate at a concentration ratio (mol/L:mol/L) of 1:1 was used.

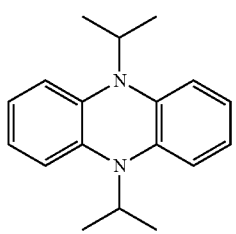

(2)

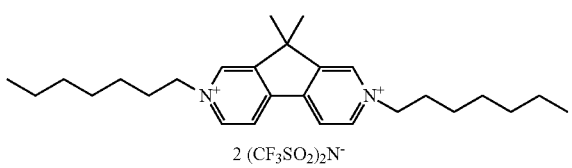

2 (CF$_3$SO$_2$)$_2$N$^-$ (3)

Figure 3A:
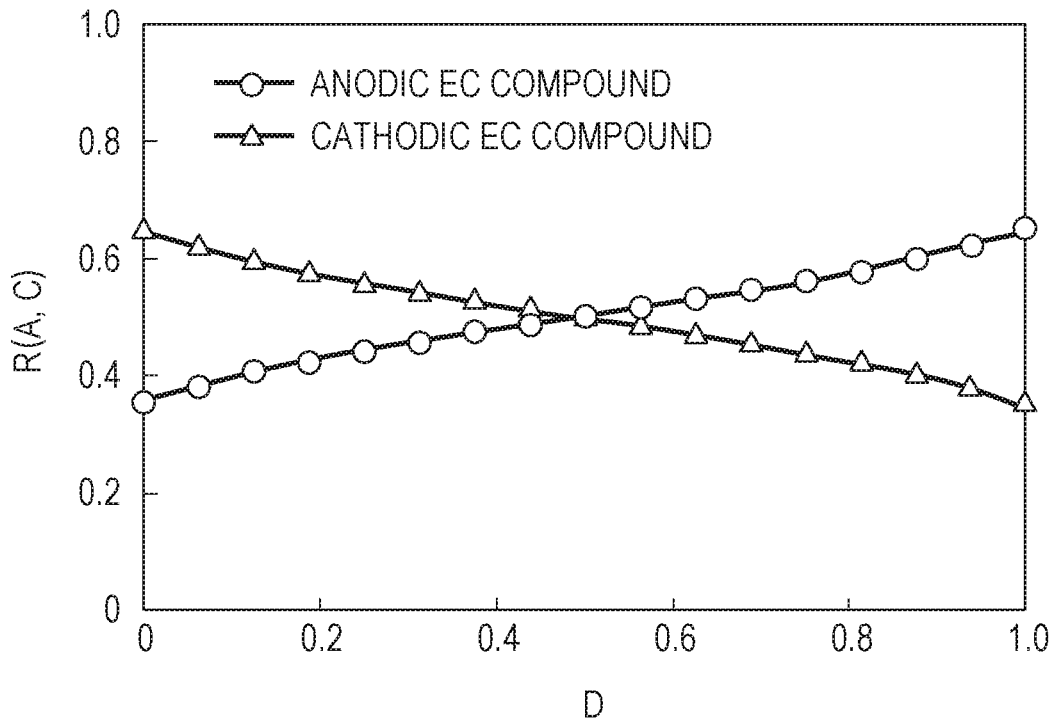
FIGS. 3A and 3B are graphs for explaining color unevenness in an EC element.
Figure 3B:
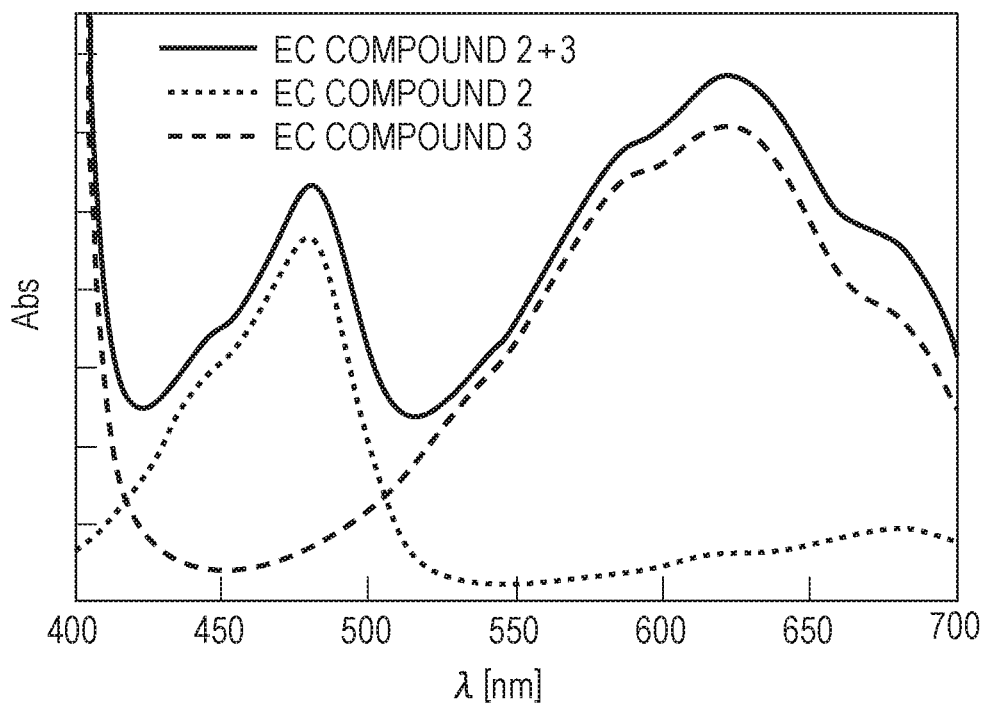

In the EC element, color unevenness occurred. Specifically, the upper part assumed a blue color, and the lower part assumed a yellow color. FIG. 3A shows the relationship between the concentration ratios R of colored forms of compound 2, which is an anodic EC compound, and compound 3, which is a cathodic EC compound, and the distance D from the top. The concentration ratios R are each expressed as a ratio with the total of the anodic EC compound and the cathodic EC compound being 1.0. This shows that in the EC element in which the typical EC compounds are used, the concentration ratios of the colored forms of the anodic EC compound and the cathodic EC compound are distributed in the range of 0.35 to 0.65. FIG. 3B shows absorption spectra of the colored forms of compound 2, which is an anodic EC compound, and compound 3, which is a cathodic EC compound, and an absorption spectrum of the total thereof. As illustrated in FIG. 3B, the colored forms of the typical anodic EC compound and the typical cathodic EC compound have different colors. Thus, when the concentration ratios are different as illustrated in FIG. 3A, color unevenness occurs due to the different colors of the colored forms.

Influence of Concentrations of EC Compounds on Color Unevenness

Figure 4A:
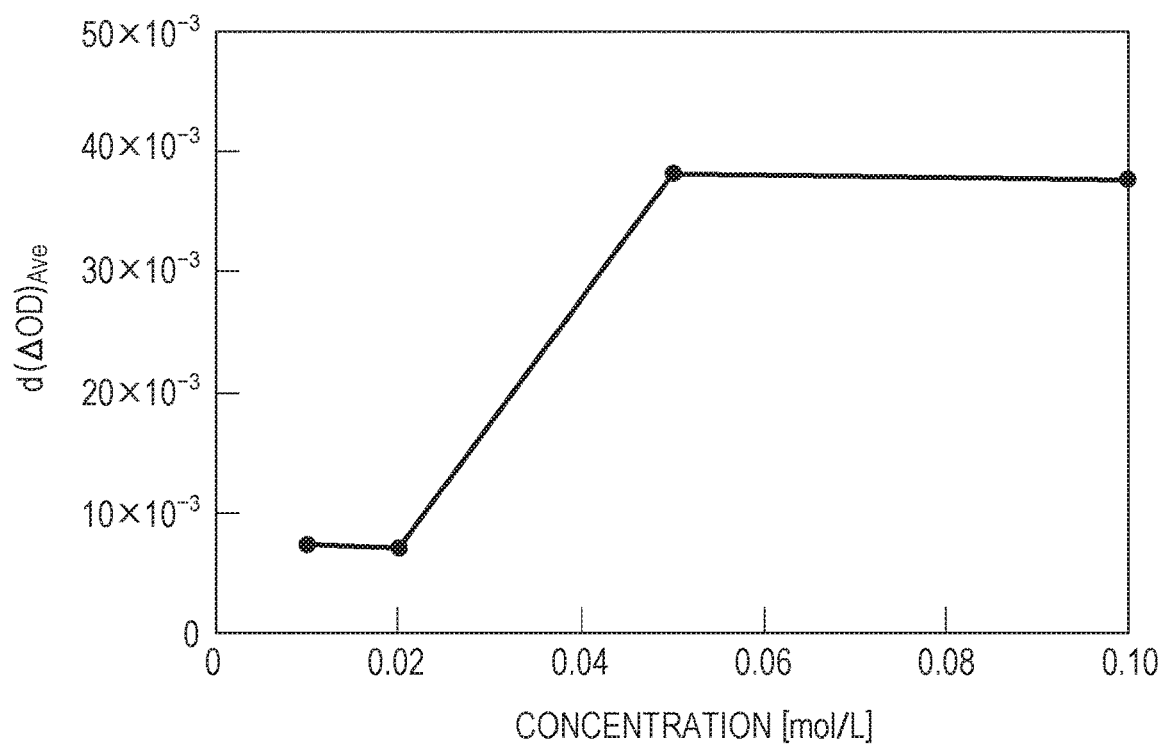
FIGS. 4A and 4B are graphs showing the relationship between the concentration of EC compounds and the degree of vertical color separation.
Figure 4B:
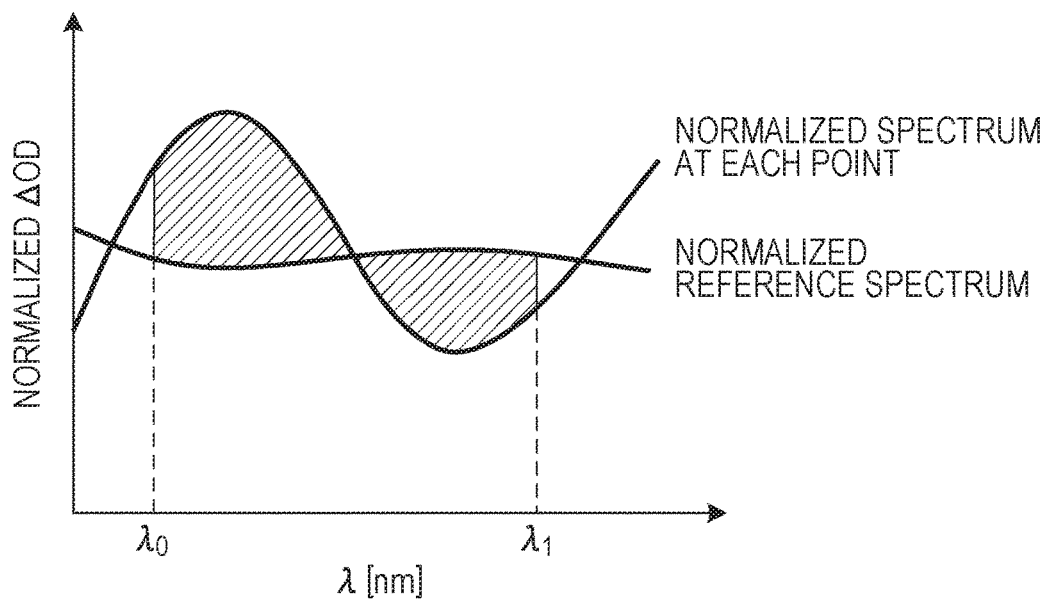

FIG. 4A is a graph showing the relationship between the concentration (mol/L) of the anodic EC compound and the cathodic EC compound and the average $(d(\Delta OD)_{Ave})$ of $d(\Delta OD)$ values at points in a plane of the EC element. Here, the meaning of $d(\Delta OD)$ and a method of calculation thereof are described with reference to FIG. 4B. In a complementary EC element, the average spectrum, which is the average of spectra at multiple points in an element plane of the EC element, does not substantially change. Thus, using the average spectrum as a reference spectrum, the degree of vertical color separation was evaluated on the basis of the deviation of the spectra at the multiple points in the plane from the reference spectrum. Specifically, the reference spectrum and the spectra at the multiple points in the plane were each normalized to eliminate the influence of concentration unevenness of the EC compounds in the EC layer in the in-plane direction of the element. The normalization was performed such that the average optical density variation ($\Delta OD$) was 1 in a predetermined wavelength range (425 nm to 700 nm in this case). For each of these normalized spectra at the multiple points in the plane, the value of $d(\Delta OD)$ was calculated by formula (I) below, where $D(\lambda)$ is a difference from the normalized reference spectrum.

$$d(\Delta OD) \sqrt{\frac{1}{\lambda_1 - \lambda_0} \int_{\lambda_0}^{\lambda_1} (D(\lambda))^2 d\lambda}$$

Formula (I)

Here, in formula (I), $\lambda_0$ represents the lower limit (nm) of a light wavelength range of interest, and $\lambda_1$ represents the upper limit of the light wavelength range of interest. The value of $d(\Delta OD)$ indicates an average divergence of the above normalized spectra at the multiple points in the plane from the reference spectrum, and the larger the value is, the more the spectra of transmitted light at the points are deviated from the reference spectrum. In the present disclosure, the value of $d(\Delta OD)$ was calculated for each of the spectra at the multiple points in the plane and used for evaluation.

FIG. 4A is a graph related to the above-mentioned EC element in which compound 2 and compound 3 are used. In the graph, the horizontal axis represents the concentration (mol/L) of the anodic EC compound and the cathodic EC compound in the EC layer, and the vertical axis represents the average degree of vertical color separation described above.

FIG. 4A shows that when the concentration of the anodic EC compound and the cathodic EC compound (the molar concentration of the EC compounds in the solution: a feed concentration that is the sum of the concentrations of the decolored form and the colored form) is 0.05 mol/L or more, vertical color separation occurs prominently. One of the causes of vertical color separation is as follows: the affinities of EC compounds for a solvent decrease when an EC element is driven, and the EC compounds form aggregates. The formation of an aggregate is greatly influenced by the concentration of a component that forms the aggregate. Specifically, an aggregate is more readily formed when the concentration of a component that forms the aggregate is higher, and when the concentration exceeds a certain value, the aggregate formation progresses rapidly. Here, the degree of aggregate formation is high and vertical color separation is strongly exhibited in a region where the concentration of the EC compounds in the EC layer is 0.05 mol/L or more.

In the EC element, when the concentration of the EC compounds in the EC layer is high, the amount of change in optical characteristics between when the EC element is driven and when not driven tends to be large. However, as described above, when the concentration of the EC compounds in the EC layer is high, aggregate formation is likely to occur, and thus vertical color separation is also likely to occur. However, the present disclosure can provide an EC element less likely to undergo color separation as described below. Thus, even when the concentration of the anodic EC compound and the cathodic EC compound is as high as 0.05 mol/L or more, an EC element less likely to undergo color separation is provided.

When the EC element according to this embodiment is used as a variable ND filter (including a variable window, variable sunglasses, etc.), the color reproducibility of the variable ND filter can be improved by absorbing light through combination of a plurality of EC compounds. The reason why a plurality of compounds are used is that, if a single EC compound is used, the shape of a spectrum of the variable ND filter is uniquely determined, and thus the improvement in color reproducibility and the suppression of the substantial influence of a light source on color reproducibility cannot (further) be increased. The plurality of EC compounds may be three or more EC compounds. The reason for this will be described below. 1. If many compounds are used when a variable transmittance spectrum is formed by combining EC compounds having different variable absorption spectra, the absorption wavelength can be complemented in more detail, which can further improve the color reproducibility and can further suppress the substantial influence of a light source on color reproducibility. 2. A spectroscope to which the ND filter is applied has three or more detection wavelength ranges as exemplified by human eyes or RGB sensors. Therefore, when the plurality of EC compounds are three or more compounds, the degree of light absorption corresponding to each of the detection wavelength ranges can be relatively flexibly set for other compounds, which effectively improves the color reproducibility. Specifically, the number of compounds is preferably four or more, more preferably six or more.

Since the EC element according to this embodiment is a complementary EC element, when a variable transmittance spectrum is obtained, there may be a limitation that the total charge concentration of the anodic EC compound in a light reduction state is equal to the total charge concentration of the cathodic EC compound in a light reduction state. In such a complementary EC element, each of the anodic EC compound and the cathodic EC compound may be constituted by a plurality of compounds to ensure the flexibility of variable transmission spectra under the limitation of the charge concentration. This is because even under the limitation of the above-described charge concentration, the concentration ratio in a light reduction state can be freely set among anodic EC compounds and among cathodic EC compounds, which effectively improves the color reproducibility.

From the above viewpoint, at least one EC compound selected from the plurality of EC compounds may have a variable absorption spectrum peak in each of the plurality of detection light wavelength ranges of the photodetector. Thus, the light absorption corresponding to the detection light wavelength ranges of the photodetector can be more flexibly set for other compounds. Here, each of the plurality of detection light wavelength ranges of the photodetector refers to a detection wavelength range having a maximum value in a normalized sensitivity spectrum of the photodetector. For example, in FIG. 5B, the detection light ranges of a plurality of detection light wavelength ranges (x-bar, y-bar, and z-bar) are x-bar: 580 to 680 nm, y-bar: 500 nm to 580 nm, and z-bar: 425 nm to 500 nm. At least one compound selected from the plurality of compounds may have a variable absorption spectrum peak in each of the ranges.

Method of Driving EC Element

The EC element according to the present disclosure may be driven by any method, preferably, by controlling the transmittance of the EC element by pulse width modulation. For example, the transmittance of the EC element is controlled by changing the ratio of a voltage application period relative to one cycle of a pulse voltage waveform while maintaining the transmittance of the EC element without changing the peak value of the pulse voltage waveform.

This ratio of a voltage application period relative to one cycle is defined as the Duty ratio. When the Duty ratio for pulse driving is maintained, the coloring of the EC compounds increases during the voltage application period, and the coloring of the EC compounds decreases during the rest period. When the EC element is driven at a constant voltage from a driving power supply without changing the Duty ratio, the change in absorbance is saturated via a transient state, and the saturated absorbance is maintained. The absorbance can be decreased by setting the Duty ratio to be smaller than the immediately previous Duty ratio. The absorbance can be increased by setting the Duty ratio to be larger than the immediately previous Duty ratio. Here, when one cycle of control signals is long, an increase or a decrease in absorbance may be visually observed. Thus, one cycle is preferably 100 milliseconds or less, more preferably 10 milliseconds or less.

Principle of Reduction of Color Unevenness in EC Element

In the present disclosure, color unevenness is reduced by focusing on the above-described difference in color between colored forms of an anodic EC compound and a cathodic EC compound in a complementary EC element. Briefly, this is achieved by making the colors of the colored forms of the anodic EC compound and the cathodic EC compound similar to each other. A specific method will be described below.

Photodetector

Figure 5A:
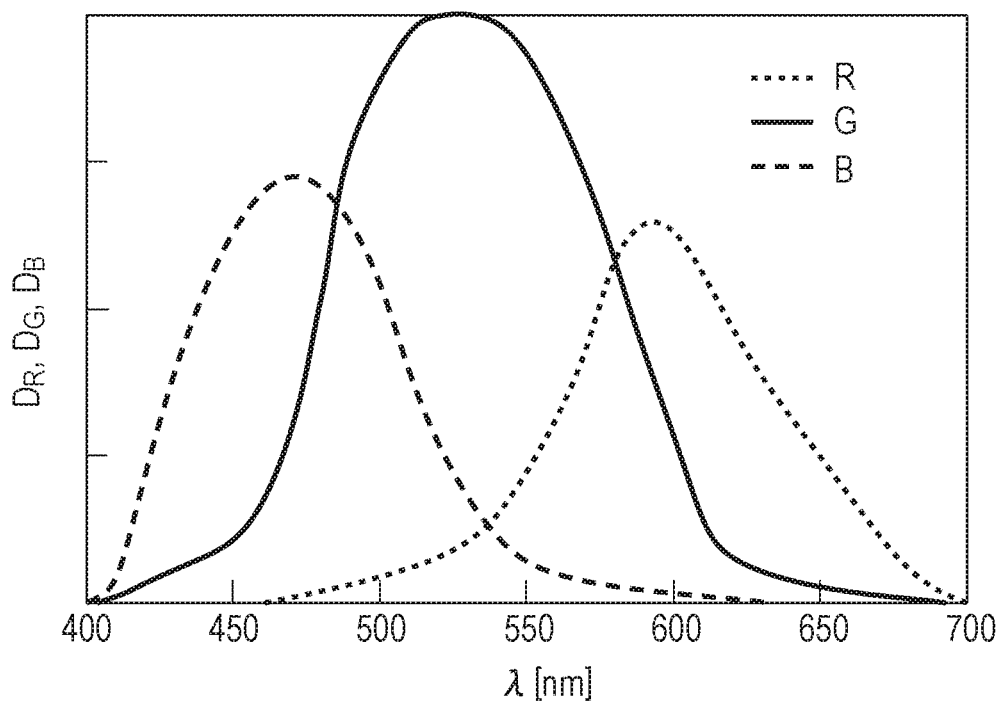
FIGS. 5A and 5B shows examples of a spectral sensitivity of a photodetector.
Figure 5B:
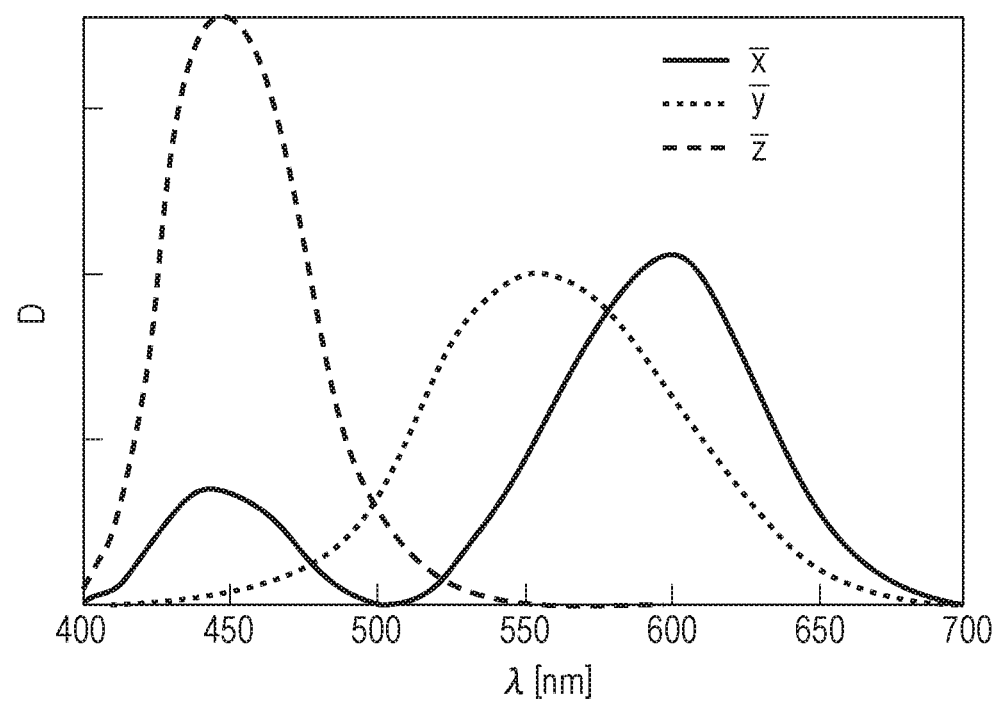

The variable transmittance of the EC element and contributions of the variable transmittance in red (R) and green (G) wavelength ranges described below are obtained by detecting light passing through the EC element with a photodetector or the like. Here, regarding the photodetector, in the case of the EC element 11 used in an optical apparatus including the photodetector 12 as illustrated in FIG. 1, required detection is performed using a detection sensitivity of the photodetector 12 to determine the composition of the EC layer. The photodetector 12 may be, for example, an image pickup element such as a CMOS sensor. When the EC element is not used in combination with a photodetector as in the case of a transmittance-variable window, transmittance-variable glasses, or a reflectance-variable mirror, required detection is performed using a photodetector having a detection light wavelength range of human eyes. In both cases, the photodetector has sensitivity in the R and G wavelength ranges and may have sensitivity also in the blue (B) wavelength range. Specific examples of spectral characteristics are shown in FIGS. 5A and 5B (the vertical axis: relative sensitivity). FIG. 5A shows an example of a CMOS sensor for imaging. FIG. 5B shows spectral characteristics of a photodetector having the same sensitivity as human eyes and having wavelength ranges of x-bar, y-bar, and z-bar (each letter has an overline) of CIE color matching functions. Examples of the CIE color matching functions include CIE (1931), CIE (1964), and CIE (2006), and 2-degree observer and 10-degree observer functions can be selected. Either of the functions may be used for calculation of $R_{RGAC}$, and in particular, the CIE (1931) 2-degree observer may be used.

Variable Transmittance VT($\lambda$)

VT($\lambda$) is defined as a variable transmittance obtained by combining changes in light absorption characteristics (e.g., changed absorption coefficients $\Delta\varepsilon(\lambda)$) of the anodic EC compound and the cathodic EC compound contained in the EC element. Here, the changed absorption coefficient $\Delta\varepsilon(\lambda)$ is a change component of a molar absorption coefficient calculated by subtracting the molar absorption coefficient of each EC compound in a transmission state from the molar absorption coefficient of the EC compound in a light reduction state. The variable transmittance VT($\lambda$) is a change component calculated by dividing the transmittance of the EC element in a light reduction state by the transmittance of the light control element in a transmission state. VT($\lambda$) can be expressed by formula (II) below, where $\Delta\varepsilon(\lambda)$ is a changed absorption coefficient of a certain EC compound n whose light absorption characteristics change, $C_n$ is a concentration in a light reduction state, and L is an optical path length of the light control element.

$$VT(\lambda)=10^{-L\Sigma\Delta\varepsilon_n(\lambda)C_n} \quad \text{Formula (II)}$$

In formula (II) above, L is an optical path length, and $C_n$ is a concentration in a light reduction state. In the case of a transmission ND filter, the optical path length L is, for example, a thickness of the EC layer in which the EC compounds are held. If light is reflected at the back surface of the ND filter and travels back and forth inside the ND filter, the optical path length L may be twice the thickness of the layer. The concentration $C_n$ is an average concentration of the EC compounds in a light reduction state at the thickness of the EC layer. Here, the light reduction state refers to a state into which the EC compounds are more likely to enter when the light control element is in a light reduction state than when the light control element is in a transmission state. Specifically, the light reduction state is, for example, a state in which the light absorption in the visible range of the EC compounds having a change in light absorption characteristics in the visible range is high.

For the variable transmittance VT($\lambda$), the variable transmittance of the anodic EC compound constituting the complementary EC element is referred to as $VT_A(\lambda)$, the variable transmittance of the cathodic EC compound constituting the complementary EC element is referred to as $VT_C(\lambda)$. The variable transmittance of the EC element can be expressed as a product of $VT_A(\lambda)$ and $VT_C(\lambda)$.

Incident Light

Figure 6A:
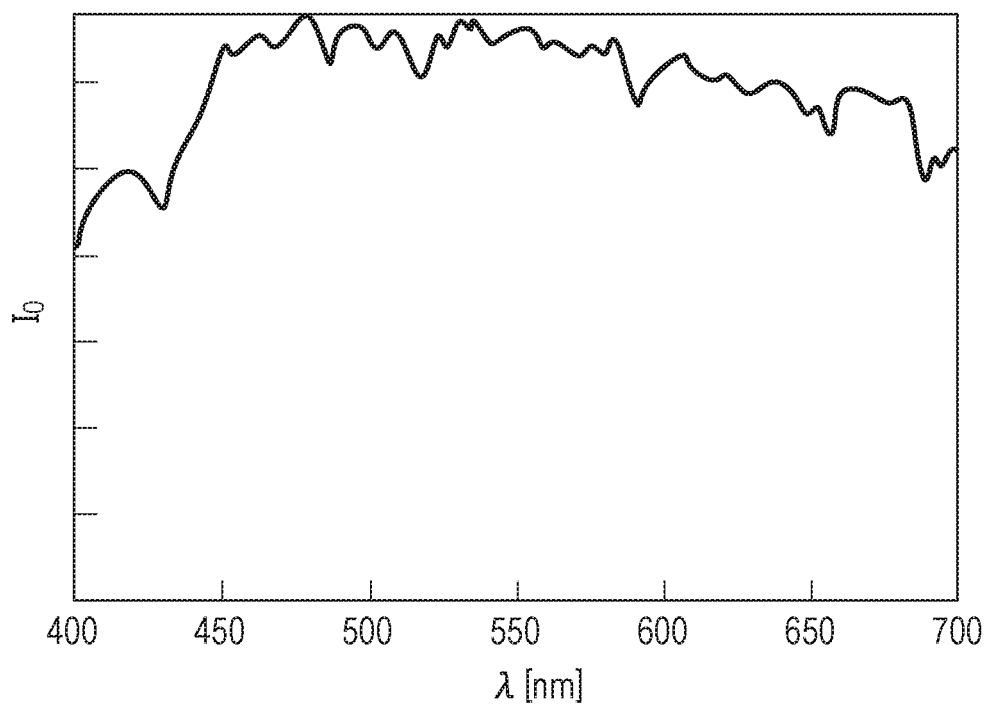
FIGS. 6A and 6B shows examples of a spectrum of a light source.
Figure 6B:
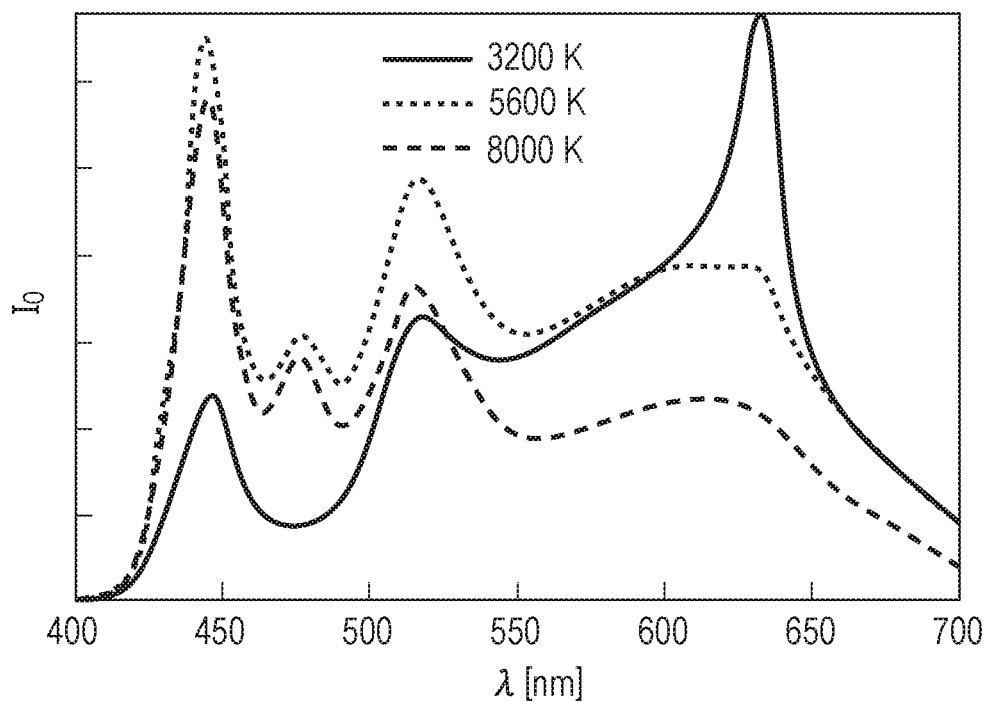

Light incident on the EC element will be described. The most common light source of light incident on the EC element is natural light in the daytime during which a variable optical filter is most frequently used. Here, source light incident on the light control element will be described. The source light incident on the light control element refers to light itself emitted from the source (light source) of light incident on the light control element, or light that has been emitted from the light source and has passed through a filter or the like. For example, when an artificial light source is used for illumination, the source light refers to light emitted from the artificial light source. When light emitted from the artificial light source is used for illumination with a filter or the like, the source light refers to light that has passed through the filter or the like. For example, in consideration of the sunlight on the earth, the source light refers to sunlight that has reached the surface of the earth through the earth's atmosphere. FIGS. 6A and 6B show spectra (the vertical axis: relative intensity) of various light sources. FIG. 6A shows an example of a spectrum of natural light in the daytime. Examples of defined light sources include CIE $D_{65}$, $D_{55}$, $D_{50}$, illuminant B, and illuminant C. Basically, the EC element of the present disclosure may be equipped for natural light in the daytime. A color temperature is widely used as a scale for expressing the color of light. On the basis of color temperature, the source (light source) of light incident on the EC element can be classified into the following three types: a low color temperature of 1800 K to 4000 K, a medium color temperature of 4000 K to 7000 K, and a high color temperature of 7000 K to 12000 K. Since the most common source of light incident on the EC element is natural light in the daytime as described above, a medium color temperature is important among the sources of light incident on the EC element. Examples of the light source for low color temperature include CIE illuminant A, incandescent lamps, and halogen lamps. Examples of the light source for high color temperature include LED light sources having corresponding color temperatures, shade in the daytime, and blue sky. The light sources for such color temperatures are also important after the light source for medium color temperature. The EC element according to this embodiment may secondly be equipped for any of medium color temperature, low color temperature, and high color temperature as a source of incident light. For the examples of the light sources corresponding to the color temperatures, FIG. 6B illustrates examples of spectra of light sources corresponding to color temperatures of 3200 K, 5600 K, and 8000 K.

The EC element according to this embodiment may be equipped for a plurality of color temperatures as sources of incident light. The EC element may further be equipped for a plurality of color temperatures including a medium color temperature. For example, the EC element may be equipped for a medium color temperature and a low color temperature, a medium color temperature and a high color temperature, or a medium color temperature, a low color temperature, and a high color temperature. Here, being equipped for a source of incident light with a certain color temperature means that when the light source is used, $R_{RGAC}$ can be in the range set forth in Claims. When the EC element is equipped for incident light with a plurality of color temperatures, the EC element can be used in wider applications. Specifically, the EC element can exhibit high color reproducibility regardless of the color temperature of a source of incident light. For example, in the case of cameras, high color reproducibility can be exhibited without distinguishing the color temperature of a light source. When it is desired to eliminate the influence of, for example, a characteristic spectrum (e.g., an emission line) specific to a light source with a particular color temperature, an imaginary light source having a flat spectrum ($I_0=1$ throughout the wavelength range covered by the detector) can be selected as a source of incident light. When the EC element is used as a variable ND filter with improved color reproduction characteristics, it is desirable to faithfully reproduce various colors. Thus, light emitted from the above-described light sources and reflected by samples having various colors may be assumed to be light incident on the EC element. Specific examples of color samples include color checkers (e.g., x-rite ColorChecker).

$R_{RGAC}$

In the EC element of the present disclosure, the degree of color unevenness is reduced by making the colors of the colored form of the anodic EC compound and the colored form of the cathodic EC compound similar to each other. $R_{RGAC}$, which is an index of the reduction, will be described with reference to the schematic view of an optical apparatus of FIG. 1 and formulae (III) below. The variable transmittance of the EC element 11 is referred to as $VT(\lambda)$. The spectral sensitivities of the photodetector (RGB image pickup element) 12 in the R (red), G (green), and B (blue) wavelength ranges are referred to as $D_R(\lambda)$, $D_G(\lambda)$, and $D_B(\lambda)$, respectively. The signal strengths in the R, G, and B wavelength ranges obtained from the photodetector 12 when the incident light 13 having a spectrum $I_0(\lambda)$, after entering the optical apparatus 10, has passed through the EC element 11 are referred to as $S_R$, $S_G$, and $S_B$, respectively. Contributions of the variable transmittance $VT_A(\lambda)$ of the anodic EC compound are referred to as $S_{RA}$, $S_{GA}$, and $S_{BA}$, and contributions of the variable transmittance $VT_C(\lambda)$ of the cathodic EC compound are referred to as $S_{RC}$, $S_{GC}$, and $S_{BC}$. The contributions are represented by formulae (III) below.

$$S_{RA} \int_{\lambda_0}^{\lambda_1} I_0(\lambda) VT_A(\lambda) D_R(\lambda) d\lambda \quad S_{RC} \int_{\lambda_0}^{\lambda_1} I_0(\lambda) VT_C(\lambda) D_R(\lambda) d\lambda$$

$$S_{GA} \int_{\lambda_0}^{\lambda_1} I_0(\lambda) VT_A(\lambda) D_G(\lambda) d\lambda \quad S_{GC} \int_{\lambda_0}^{\lambda_1} I_0(\lambda) VT_C(\lambda) D_G(\lambda) d\lambda$$

$$S_{BA} \int_{\lambda_0}^{\lambda_1} I_0(\lambda) VT_A(\lambda) D_B(\lambda) d\lambda \quad S_{BC} \int_{\lambda_0}^{\lambda_1} I_0(\lambda) VT_C(\lambda) D_B(\lambda) d\lambda \quad \text{Formulae (III)}$$

In formulae (III) above, $\lambda_0$ is a lower-limit wavelength in a detection light wavelength range of the photodetector, and $\lambda_1$ is an upper-limit wavelength in the detection light wavelength range of the photodetector. One typical example of the detection light wavelength range of the photodetector is a range of 425 nm or more and 680 nm or less. Another example of the detection light wavelength range is a wavelength range having a sensitivity of 10% or more of the maximum spectral sensitivity of the photodetector.

The transmittance of the EC element in a light reduction state is a transmittance obtained by multiplying the transmittance in a transmission state by the variable transmittance $VT(\lambda)$. The EC element in a transmission state has a higher transmittance than the EC element in a light reduction state. Typically, the EC element in a transmission state has the highest transmittance. When the characteristics at the highest transmittance of the EC element are low, the transmission state may be selected in the range in which the EC element can be effectively used as an optical filter. The light reduction ratio between the transmission state and the light reduction state of the EC element (the ratio of the amounts of light emitted after the same amount of light enters the EC element (transmission state/light reduction state)) is desirably 8 (in the case of an ND filter, ND8: 3 stops) or more, more preferably 32 (in the case of an ND filter, ND32: 5 stops) or more. There are two reasons for this.

(1) Usefulness as EC Element

When the light reduction ratio is 8 or less, the adjustable range of the EC element is limited, and the EC element can be used in very limited applications as a variable optical filter. When the light reduction ratio is 32 or more, the applicability of the EC element as a variable optical filter is dramatically expanded.

(2) As the Light Reduction Ratio Increase, the Influence of Color Unevenness Becomes More Significant.

The EC element is a light-absorbing element and forms an absorbance (absorption) spectrum having a particular waveform by combining EC compounds. The shape of the absorbance spectrum basically (ideally) remains unchanged regardless of the concentration. On the other hand, the amount of light that enters an image pickup element or a human eye serving as a photodetector is determined by "amount of incident light×transmittance". Therefore, when a color normalized by the amount of light is discussed, a normalized transmittance is used. Here, since the relationship between absorbance Abs and transmittance T is expressed as $T=10^{-Abs}$ the influence of the variation in absorbance due to wavelength (=the influence of color unevenness) exponentially increases as the absorbance increases. Therefore, when the light reduction ratio is as small as 8 or less, the light reduction change of the EC element has a relatively small influence on color unevenness. On the other hand, when the light reduction ratio is 8 or more, the light reduction change of the EC element has a large influence on color unevenness, and the influence is very large when the light reduction ratio is 32 or more. According to the EC element of the present disclosure, color unevenness in the EC element can be effectively reduced even in a range having such a high light reduction ratio.

$R_{RGAC}$ and $R_{BGAC}$, ratios of the anodic EC compound component to the cathodic EC compound component in terms of values obtained by normalizing signals of R and B relative to G of RGB, are expressed by formulae (IV) below.

$$R_{RGAC} = (S_{RA}/S_{GA})/(S_{RC}/S_{GC})$$

$$R_{BGAC} = (S_{BA}/S_{GA})/(S_{BC}/S_{GC}) \quad \text{Formulae (IV)}$$

The influence of $R_{RGAC}$ and $R_{BGAC}$ on color unevenness is evaluated using color difference (CIEDE2000 ($\Delta E_{00}$)). Specifically, evaluation is conducted using a color difference, that is, a difference in color between when the concentrations of the colored forms of the anodic EC compound and the cathodic EC compound are the same and when the concentrations of the colored forms of the anodic EC compound and the cathodic EC compound changed. It turned out that the influence of $R_{RGAC}$ on color difference was much greater than that of $R_{BGAC}$ by a factor of 2.5. Thus, in the present disclosure, $R_{RGAC}$ was used as a more effective index to reduce color unevenness.

The degree of reduction in color unevenness increases as the color difference decreases, which will be described with reference to Tables of NIPPON DENSHOKU INDUSTRIES Co., Ltd. widely known as the index of color difference. The light control element having high color reproducibility needs to have a color difference smaller than Grade C color tolerance ($\Delta E_{00}$: 6.5 to 13.0). The Grade C color tolerance refers to a color difference corresponding to one step in the JIS standard color chart, the Munsell color chart, or the like. Preferably, the color difference needs to be smaller than Grade B color tolerance ($\Delta E_{00}$: 3.2 to 6.5). The Grade B color tolerance refers to a color difference at which the colors are regarded as the same in terms of impression, but are sometimes regarded as different colors in the paint industry and the plastics industry, resulting in complaints. More preferably, the color difference needs to be smaller than Grade A color tolerance ($\Delta E_{00}$: 1.6 to 3.2). The Grade A color tolerance refers to a color difference at which when colors are separately compared with each other, the difference is substantially not recognized and the colors are considered to be the same in general.

Figure 7:
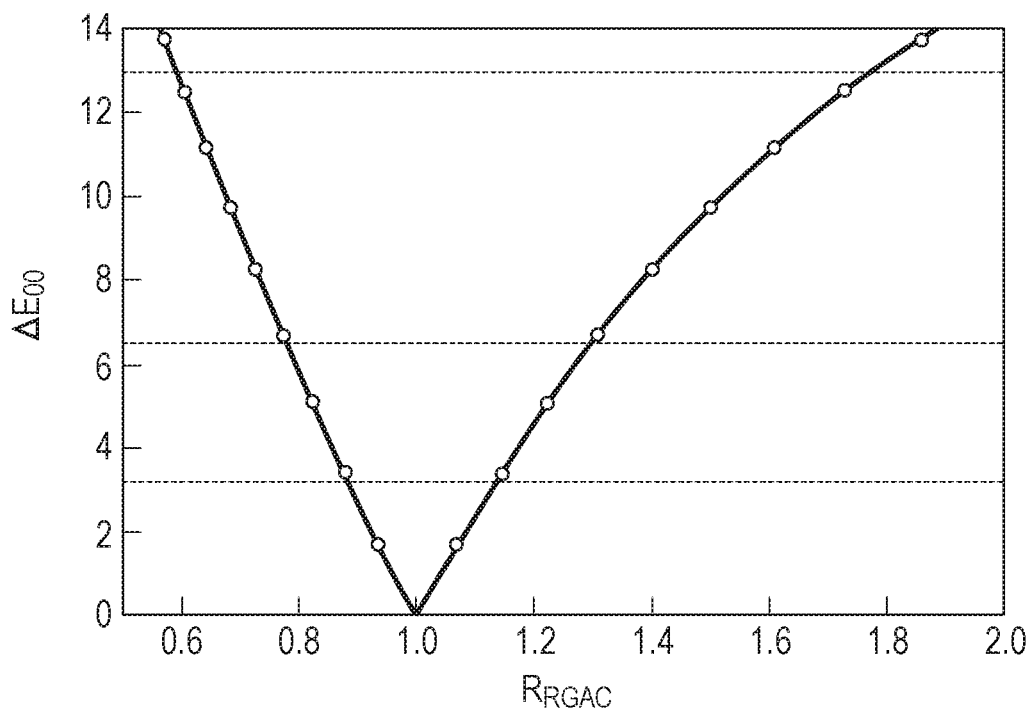
FIG. 7 is a graph showing the relationship between $R_{RGAC}$ and color difference relative to a predetermined color.

FIG. 7 shows the results of simulation of the relationship of $R_{RGAC}$ and maximum color difference $\Delta E_{00}$ (maximum color unevenness) relative to a predetermined color of a camera system under the following conditions.
Light source: natural light in the daytime shown in FIG. 6A
Object: 24 patterns of a color checker
Photodetector: photodetector having a spectral sensitivity shown in FIG. 5A
EC element: EC element having a concentration profile in FIG. 3B From this it can be seen that by bringing $R_{RGAC}$ close to 1, color unevenness (expressed as color difference ($\Delta E_{00}$) here) is decreased. Thus, according to the EC element of the present disclosure, the degree of color unevenness can be reduced by making the colors of the colored forms of the anodic EC compound and the cathodic EC compound similar to each other. It can also be seen that by satisfying $0.59 \leq R_{RGAC} \leq 1.78$, more preferably $0.591 \leq R_{RGAC} \leq 1.78$, a color difference of $\Delta E_{00} \leq 13.0$, which is the Grade C color tolerance, can be achieved as the light control element having high color reproducibility. Similarly, by satisfying $0.77 \leq R_{RGAC} \leq 1.30$, more preferably $0.779 \leq R_{RGAC} \leq 1.30$, the Grade B color tolerance ($\Delta E_{00} \leq 6.5$) can be achieved, and by satisfying $0.88 \leq R_{RGAC} \leq 1.13$, more preferably $0.885 \leq R_{RGAC} \leq 1.13$, the Grade A color tolerance ($\Delta E_{00} \leq 3.2$) can be achieved. Thus, the range of $R_{RGAC}$ of the EC element of the present disclosure is preferably $0.59 \leq R_{RGAC} \leq 1.78$, more preferably $0.77 \leq R_{RGAC} \leq 1.3$, still more preferably $0.88 \leq R_{RGAC} \leq 1.13$. Alternatively, the range of $R_{RGAC}$ is preferably $0.591 \leq R_{RGAC} \leq 1.78$, more preferably $0.779 \leq R_{RGAC} \leq 1.3$, still more preferably $0.885 \leq R_{RGAC} \leq 1.13$.

Advantageous Effects

Even when the EC element of the present disclosure, serving as a density variable filter, is continuously driven for a long time in a vertical standing position, color unevenness due to vertical color separation, which is a phenomenon in which the colored forms of the anodic EC compound and the cathodic EC compound are vertically separated from each other, can be reduced. Color unevenness that may occur when the concentration ratio of the colored forms of the anodic EC compound and the cathodic EC compound is changed from a predetermined ratio due to other factors can also be reduced.

Thus, according to the present disclosure, color unevenness including vertical color separation can be reduced without greatly increasing the viscosity of the EC layer, and thus color unevenness including vertical color separation can be reduced while reducing a decrease in element responsivity. Color unevenness including vertical color separation can be further reduced by appropriately increasing the viscosity of the EC layer, and thus color unevenness including vertical color separation can also be further reduced while securing the element responsivity.

Other Applications

An electrochromic element according to an embodiment of the present disclosure may be used for a light control window. The light control window includes a first substrate, a second substrate, and an electrochromic element disposed between the first substrate and the second substrate. The light control window may be used, for example, for an automobile or an airplane as a window that can change transmittance.

An electrochromic element according to an embodiment of the present disclosure may also be used for an image pickup apparatus. The image pickup apparatus includes an optical system having a plurality of lenses, an image pickup element that receives light passing through the optical system, and an optical filter disposed between the optical system and the image pickup element. The optical filter includes an electrochromic element and can change transmittance. By changing transmittance during imaging, an excess of the upper brightness limit of the image pickup element during imaging, i.e., overexposure can be reduced.

EXAMPLES

The present disclosure will now be described in more detail with reference to examples, but these examples are not intended to limit the present disclosure.

EC Compound

Anodic EC compounds 4 to 6 represented by formulae (4) to (6) below were synthesized with reference to a patent literature (Japanese Patent No. 6012689), and anodic EC compounds 9 to 12 represented by general formulae (9) to (12) were synthesized with reference to a patent literature (Japanese Patent Laid-Open No. 2019-070789).

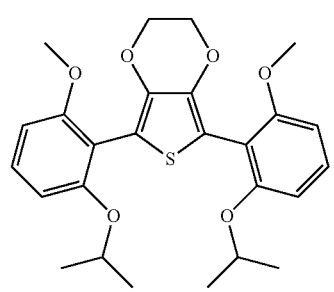

(4)

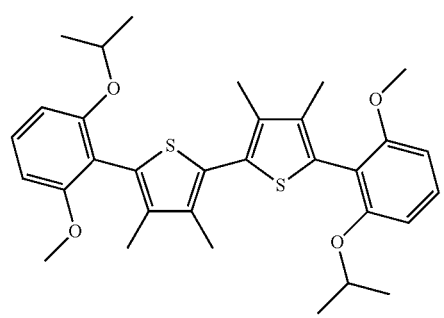

(5)

-continued (6)

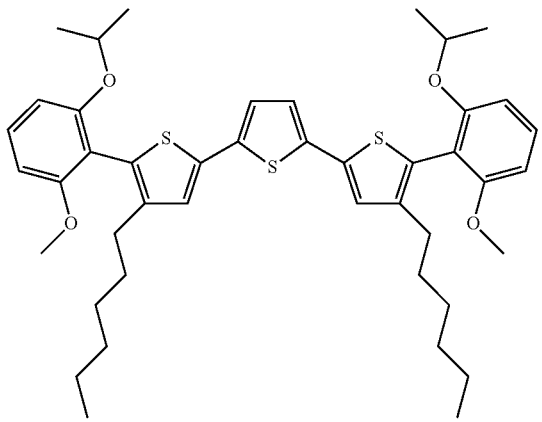

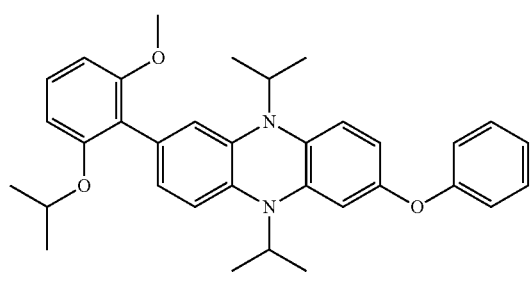

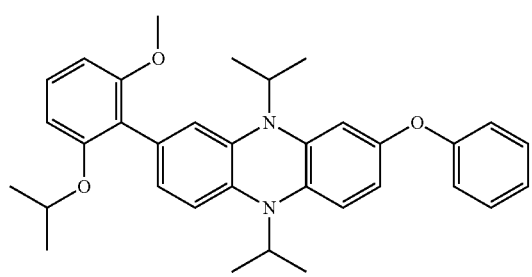 [SMILES: COc1cccc(OC(C)C)c1-c1ccc2c(c1)N(C(C)C)c1cc(Oc3ccccc3)ccc1N2C(C)C]

Cathodic EC compounds 7 and 8 represented by formulae (7) and (8) below were synthesized with reference to Japanese Patent Laid-Open No. 2017-165708, cathodic EC compounds 12 and 13 represented by general formulae (12) and (13) were synthesized with reference to Japanese Patent Laid-Open No. 2019-070789, and a cathodic EC compound 14 represented by general formula (14) were synthesized with reference to WO2017/010360.

(7)

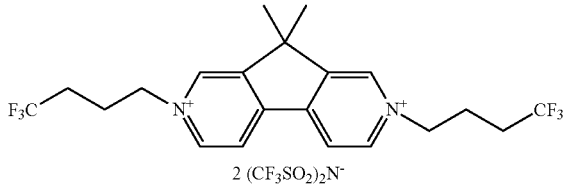

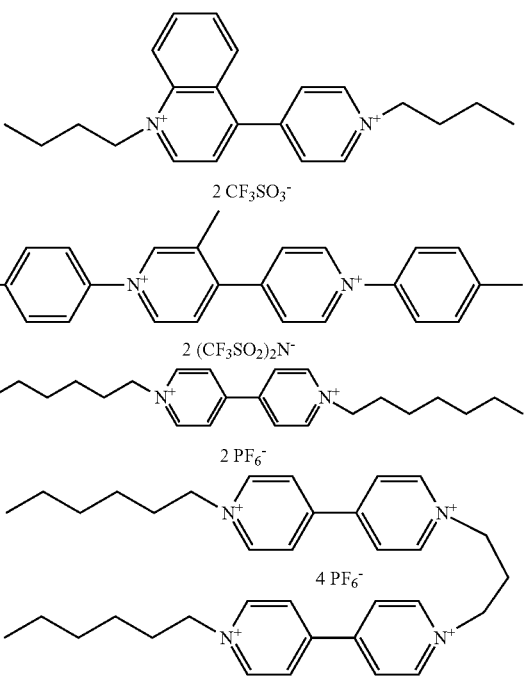

<Production of EC Element>

An EC element having a structure illustrated in FIG. 2 was produced by the following method.

Two light-transmitting electroconductive glasses 26 and 27 on which indium-doped tin oxide (ITO) films, serving as electrodes 21 and 22, were respectively formed were provided and disposed such that the ITO films faced each other. The outer edges of the two light-transmitting electroconductive glasses 26 and 27 were then bonded to each other using a sealing member 25 containing spacer beads having a diameter of 50 μm. EC compounds were dissolved in propylene carbonate. The solution was injected through an inlet (not illustrated) preliminarily formed in the light-transmitting electroconductive glass 26, whereby the space created by the two light-transmitting electroconductive glasses 26 and 27 and the sealing member 25 was filled with the solution. The molar concentration of the EC compounds in the solution was set to about 0.2 mol/L. Thereafter, the inlet (not illustrated) was sealed with a sealing member. In this manner, EC elements of Example and Comparative Example were obtained.

Construction of Variable Transmittance VT(λ)

Example A

Figure 8:
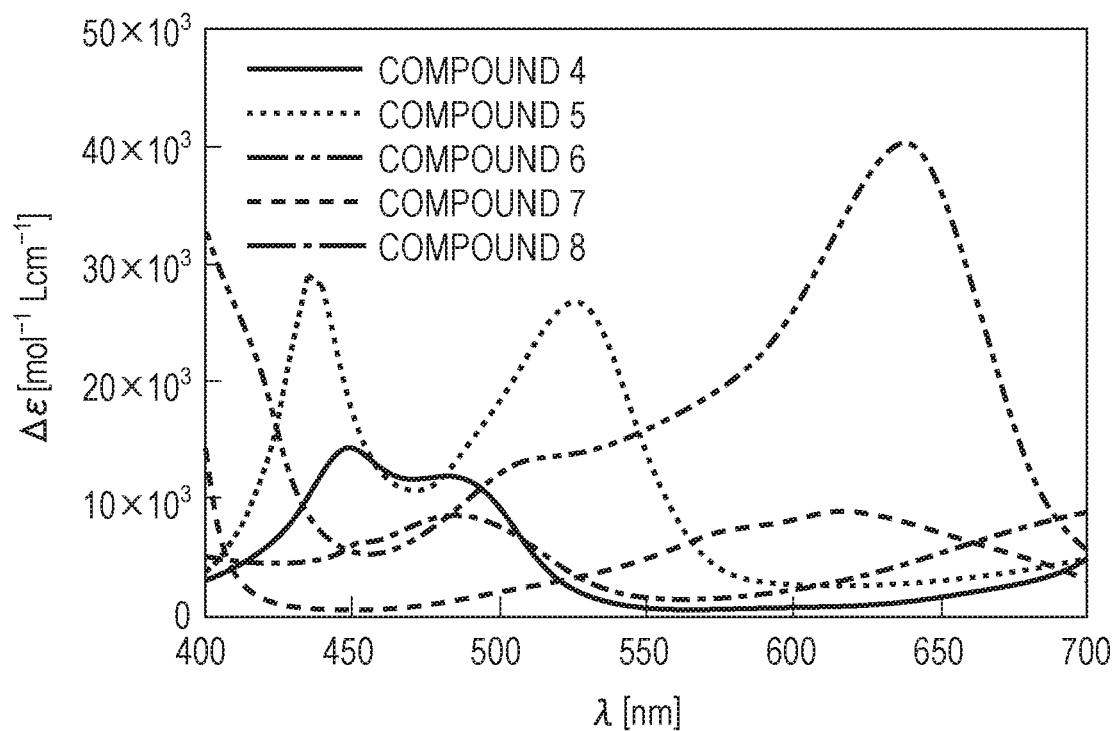
FIG. 8 is a graph showing changed absorption coefficient spectra of EC compounds used in Example of the present disclosure and Comparative Example.

The variable transmittance VT(λ) of the EC elements of Example 1 and Comparative Example 1 is constructed. FIG. 8 shows changed absorption coefficient spectra of the EC compounds 4 to 8. The light reduction ratio between the transmission state and the light reduction state of the EC elements was set to 8 (=average variable transmittance 12.5%).

Variable Transmittance VT(λ) of Examples

Figure 9A:
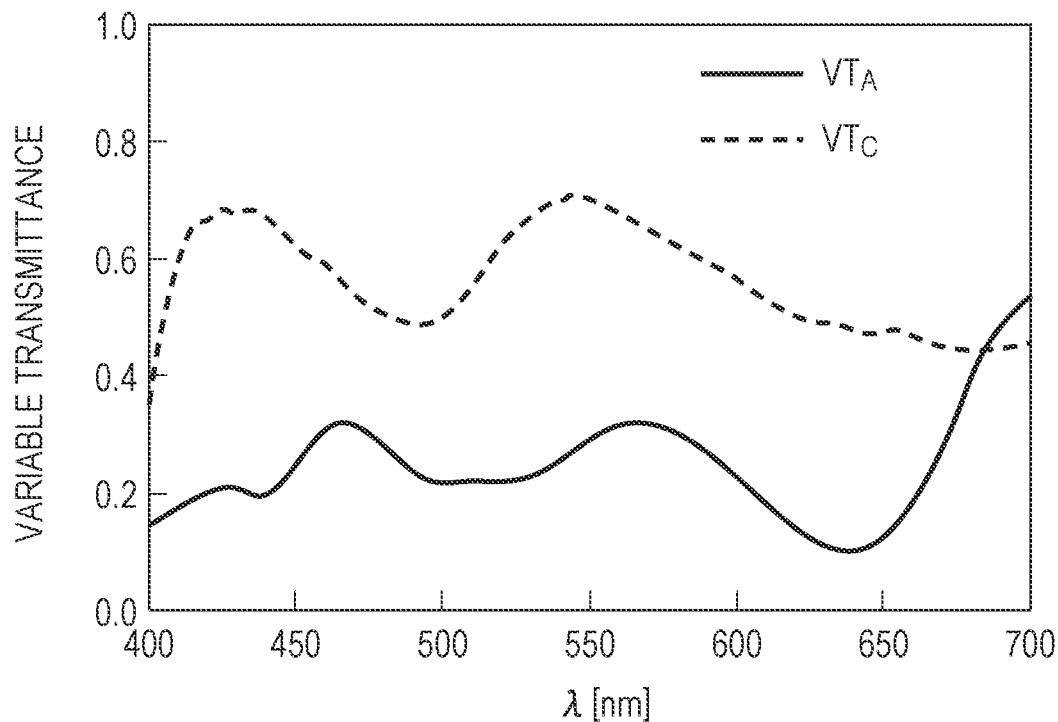
FIG. 9A is a graph showing variable transmittance spectra of an anodic EC compound and a cathodic EC compound of Example of the present disclosure.
Figure 9B:
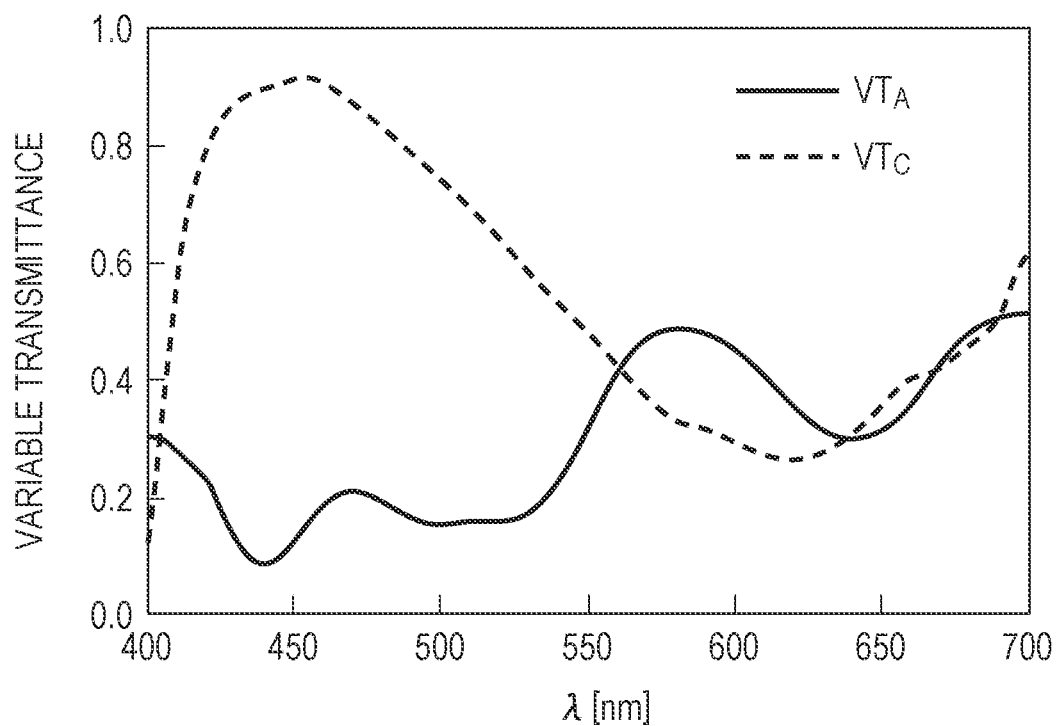
FIG. 9B is a graph showing variable transmittance spectra of an anodic EC compound and a cathodic EC compound of Comparative Example.

FIGS. 9A and 9B each show a variable transmittance spectrum ($VT_A(\lambda)$ and $VT_C(\lambda)$) of an anodic EC compound obtained by combining the EC compounds 4 to 6 and a cathodic EC compound obtained by combining the EC compounds 7 and 8. Here, three are anodic compounds, and two are cathodic compounds. The total number of EC compounds used is five. The detection light wavelength range of a photodetector used here was the range from 425 nm to 680 nm of a photodetector (image pickup element) illustrated in FIG. 5A. The EC compounds 6 and 7 have a variable absorption spectrum peak in the R range of the photodetector, the EC compounds 5 and 8 in the G range of the photodetector, and the EC compounds 4 and 5 in the B range of the photodetector. FIG. 9A corresponds to Example, and FIG. 9B corresponds to Comparative Example. $R_{RGAC}$ calculated using a photodetector having a spectral sensitivity shown in FIG. 5A and an imaginary light source having a flat spectrum is 0.95 (Example) and 2.43 (Comparative Example). Table 1 shows the concentration (mmol/L) in a light reduction state of the EC compounds at this time.

TABLE 1

|  |  | Concentration in light reduction state (mmol/L) | |
|---|---|---|---|
|  |  | Example | Comparative Example |
| Anodic EC compound | EC compound 4 | 7.0 | 11.1 |
|  | EC compound 5 | 3.5 | 6.9 |
|  | EC compound 6 | 7.7 | 3.5 |
| Cathodic EC compound | EC compound 7 | 7.0 | 21.5 |
|  | EC compound 8 | 11.1 | 0.0 |

Evaluation and Results

Figure 10A:
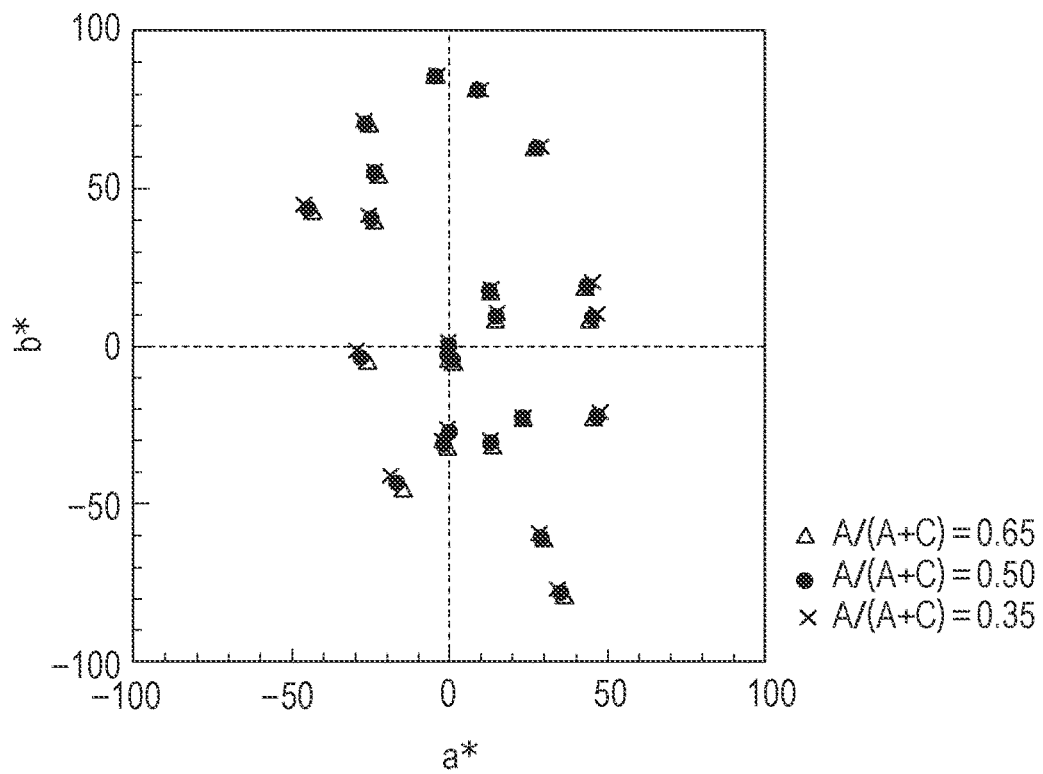
FIGS. 10A and 10B are graphs showing the influence of concentration unevenness of EC compounds on color in EC elements of Example and Comparative Example.
Figure 10B:
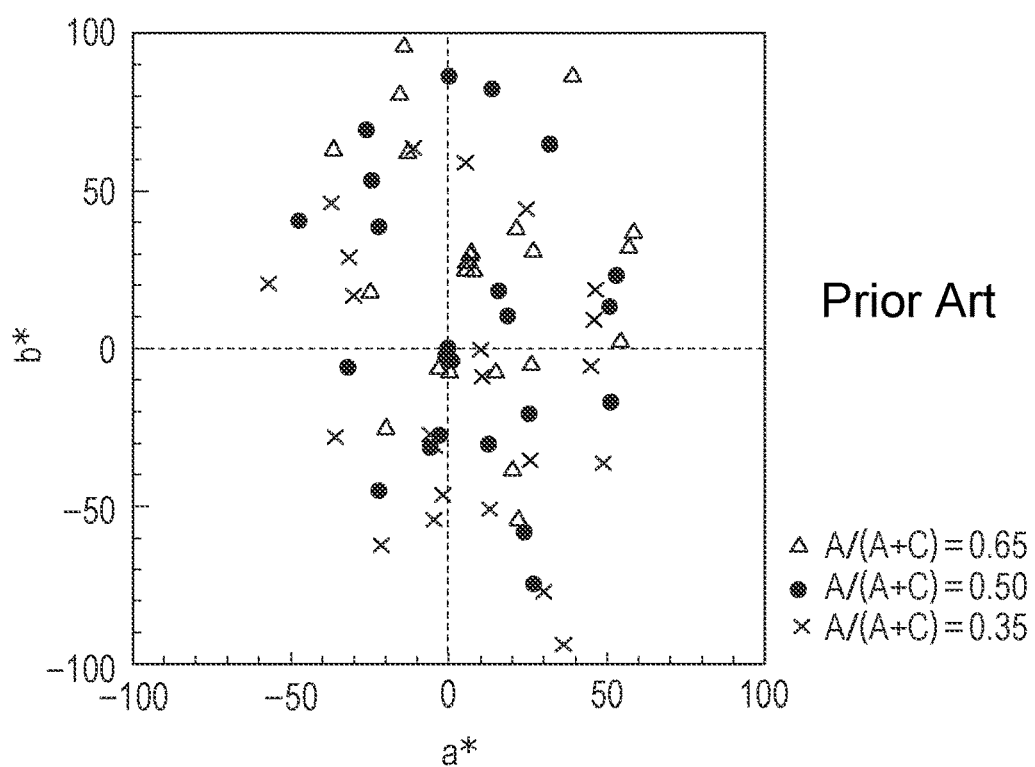

FIGS. 10A and 10B each show the change in color of an EC element having a variable transmittance VT(λ) in a colored state, the color being acquired by an image pickup element of a camera when the concentration ratio of the anodic EC compound is shifted. The amount of shift of the concentration ratio was set such that the ratio of the concentration of the anodic EC compound to the concentration of the whole EC compound (A/(A+C)) was shifted from 0.5 (set ratio) to 0.65 and 0.35. Specifically, the color of each EC element in a colored state was plotted on the a*b* plane of the L*a*b* space. At this time, the spectrum of natural light in the daytime shown in FIG. 6A and a photodetector having a spectral sensitivity shown in FIG. 5A were used, and 24 patterns of a color checker were each used as an object. In FIGS. 10A and 10B, when plots at shifted coloring ratios (triangles and crosses) are close to reference plots at A/(A+C)=0.5 (black dots), it means that the color change due to the change in concentration ratio is small. In other words, it means that color uniformity is high (=the degree of color unevenness is low) even if there is a part in the EC element where the anodic EC compound and the cathodic EC compound have different concentration ratios. FIGS. 10A and 10B show characteristics of the EC elements of Example and Comparative Example, respectively. Comparison of FIGS. 10A and 10B shows that the EC element of Example, whose $R_{RGAC}$ is closer to 1, exhibits smaller gaps between the plots and a smaller color change, that is, a smaller degree of color unevenness.

Figure 11:
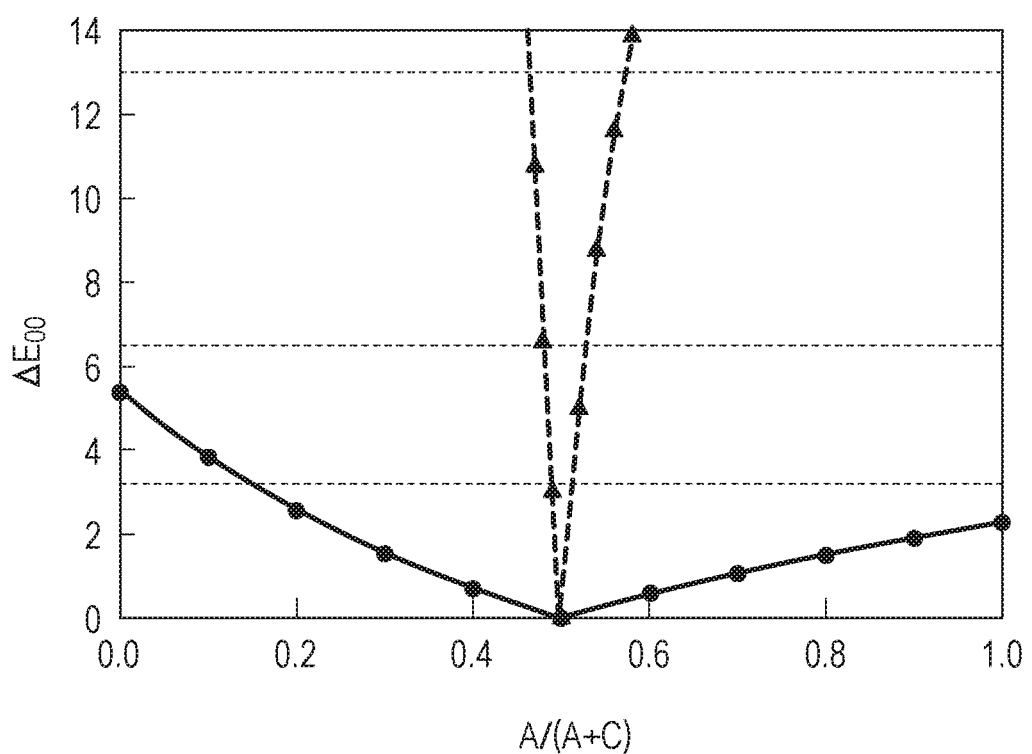
FIG. 11 is a graph showing the relationship between concentration unevenness of EC compounds and color difference in EC elements of Example and Comparative Example.

FIG. 11 shows the results of a comparison of colors of the color checker at the time when the concentration ratio of the anodic EC compound (A/(A+C)) is shifted and a color of the color checker at the set ratio (0.5) under the same conditions as in FIGS. 10A and 10B. The difference in color is quantified as a color difference ($\Delta E_{00}$) and plotted with the maximum value of $\Delta E_{00}$ on the vertical axis and the concentration ratio of the anodic EC compound (A/(A+C)) on the horizontal axis. It can be seen that in the EC element of Comparative Example, whose $R_{RGAC}$ is relatively far from 1, the change in color difference is large when the concentration ratio is changed, i.e., the degree of color unevenness is high when there is a part with different concentration ratios in the EC element. By contrast, in the EC element of Example, whose $R_{RGAC}$ is close to 1, the color difference is small even when the concentration ratio is greatly changed, i.e., the color change is very small (=the degree of color unevenness is low).

Example B: Control by Selection of Concentration of EC Compounds

Construction of Variable Transmittance VT(λ)

An anodic EC compound obtained by combining the EC compounds 4 to 6 and a cathodic EC compound obtained by combining the EC compounds 7 and 8 are combined to construct variable transmittance spectra ($VT_A(\lambda)$ and $VT_C(\lambda)$). Here, three are anodic compounds, and two are cathodic compounds. The total number of EC compounds used is five. The detection light wavelength range of a photodetector used here was the range from 425 nm to 680 nm of a photodetector (image pickup element) illustrated in FIG. 5A. The EC compounds 6 and 7 have a variable absorption spectrum peak in the R range of the photodetector, the EC compounds 5 and 8 in the G range of the photodetector, and the EC compounds 4 and 5 in the B range of the photodetector. Table 2 shows the concentration (mmol/L) in a light reduction state of the EC compounds of Examples and Comparative Examples and $R_{RGAC}$ calculated using a photodetector having a spectral sensitivity in FIG. 5A and, as a light source, natural light in the daytime having a spectrum shown in FIG. 6A (color temperature: 5600 K).

TABLE 2

|  | Concentration in light reduction state/mM, $R_{RGAC}$ | | | | |
|---|---|---|---|---|---|
| EC compound | Example 2 | Example 3 | Example 4 | Comparative Example 2 | Comparative Example 3 |
| Compound 4 | 7.0 | 7.8 | 8.6 | 10.1 | 11.1 |
| Compound 5 | 3.5 | 4.1 | 4.8 | 6.0 | 6.9 |
| Compound 6 | 7.7 | 6.9 | 6.0 | 4.6 | 3.5 |
| Compound 7 | 7.0 | 9.9 | 12.8 | 17.9 | 21.5 |

TABLE 2-continued

| | Concentration in light reduction state/mM, $R_{RGAC}$ | | | | |
|---|---|---|---|---|---|
| EC compound | Example 2 | Example 3 | Example 4 | Comparative Example 2 | Comparative Example 3 |
| Compound 8 | 11.1 | 8.9 | 6.7 | 2.8 | 0.0 |
| $R_{RGAC}$ | 0.95 | 1.13 | 1.36 | 1.88 | 2.37 |

Evaluation and Results

Figure 12A:
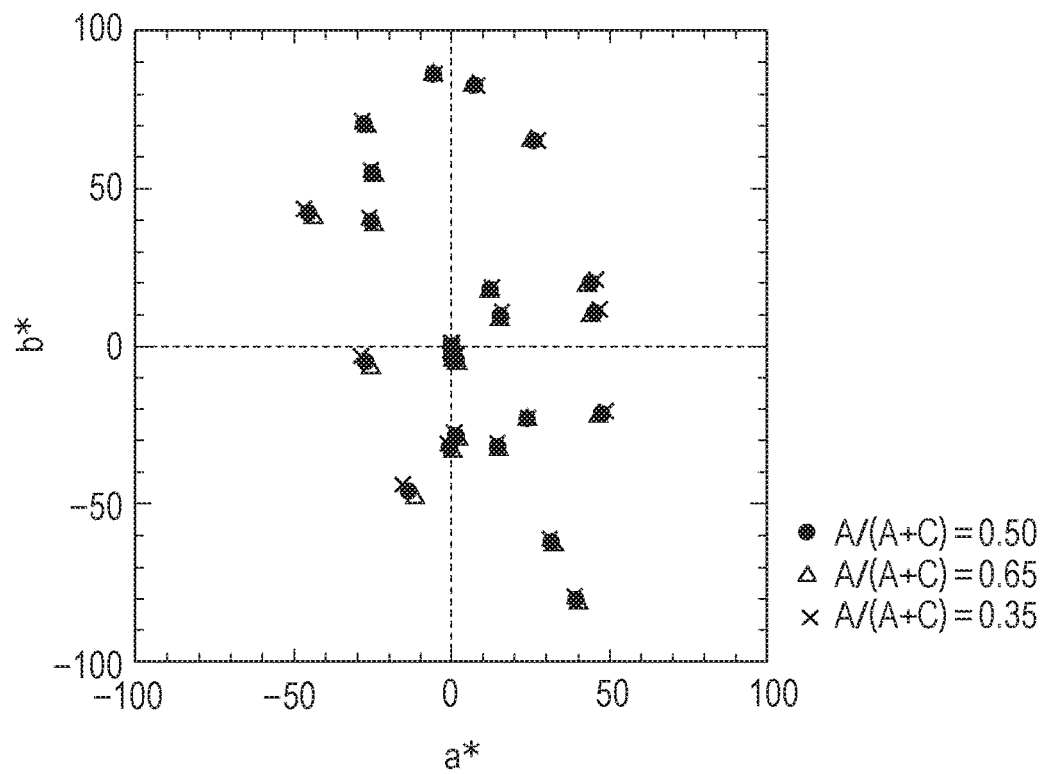
FIGS. 12A to 12E are graphs showing the influence of concentration unevenness of EC compounds on color in EC elements of Examples and Comparative Examples.
Figure 12B:
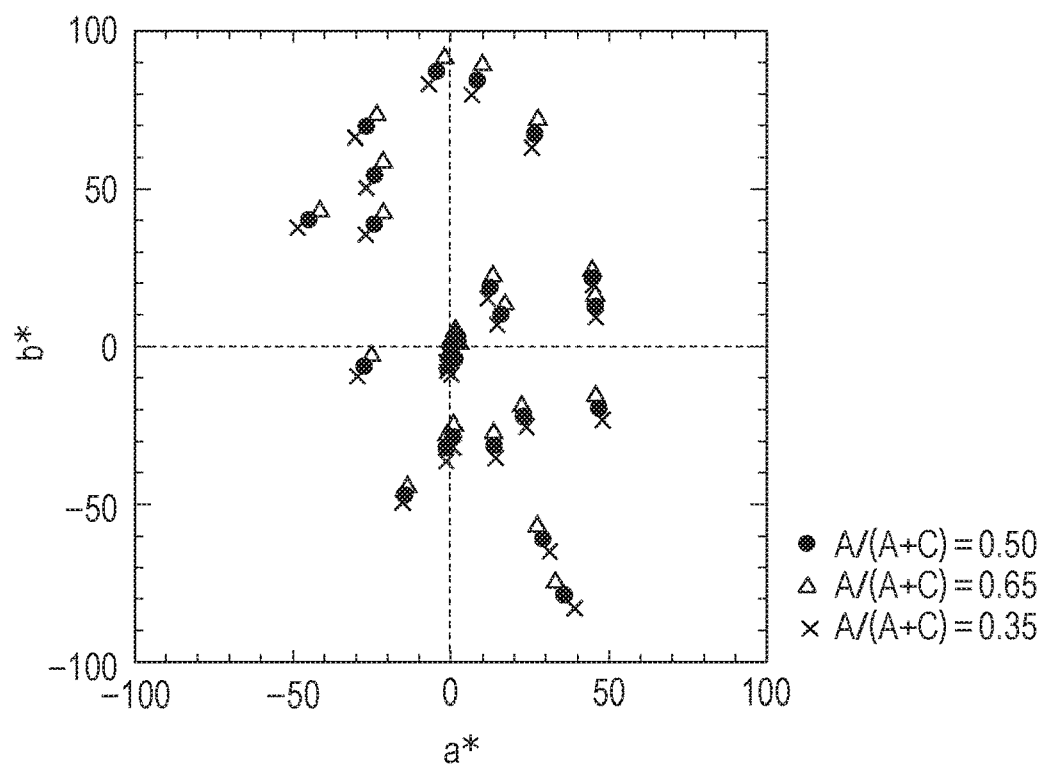
Figure 12C:
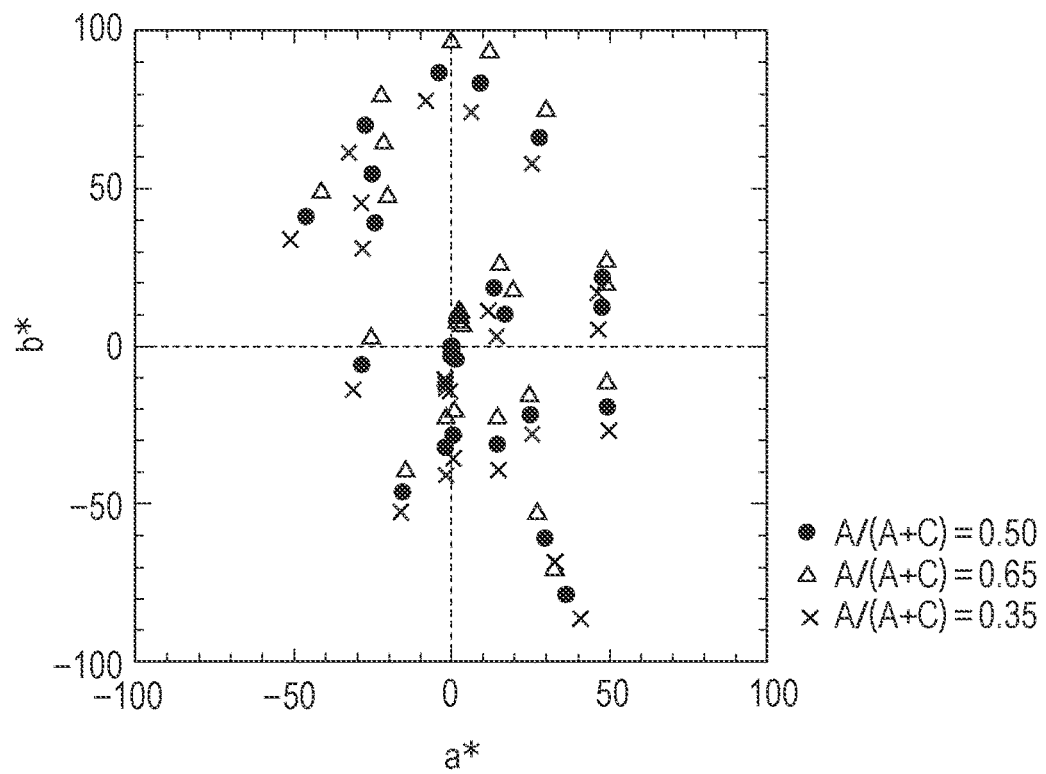
Figure 12D:
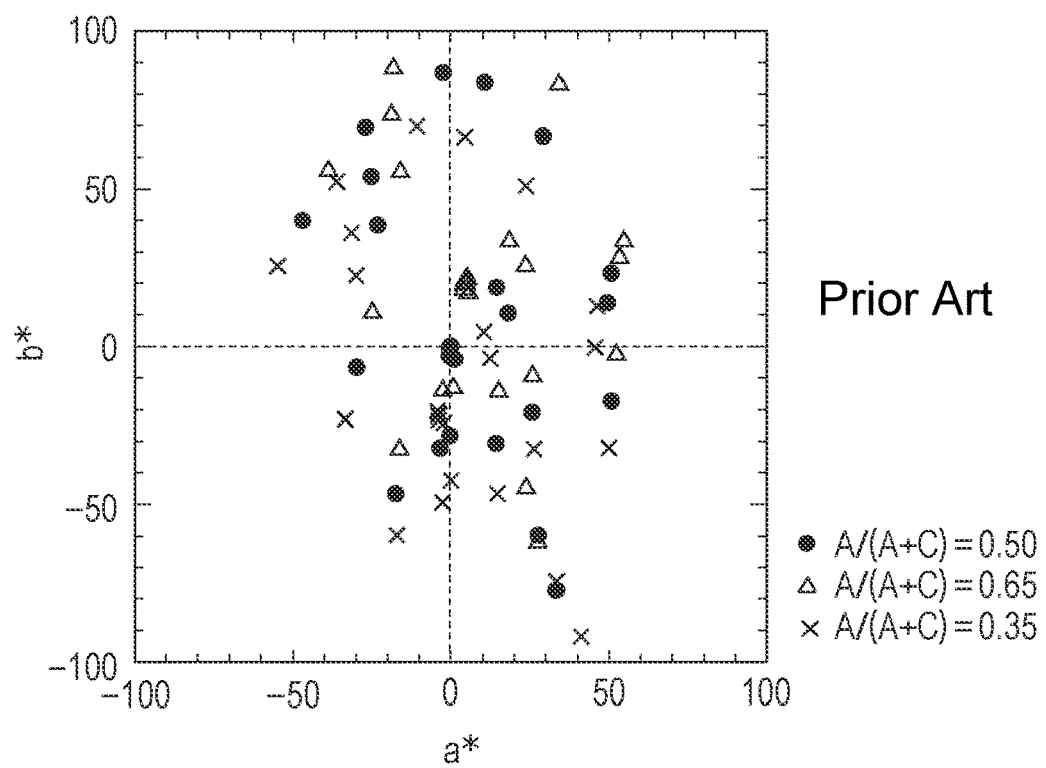
Figure 12E:
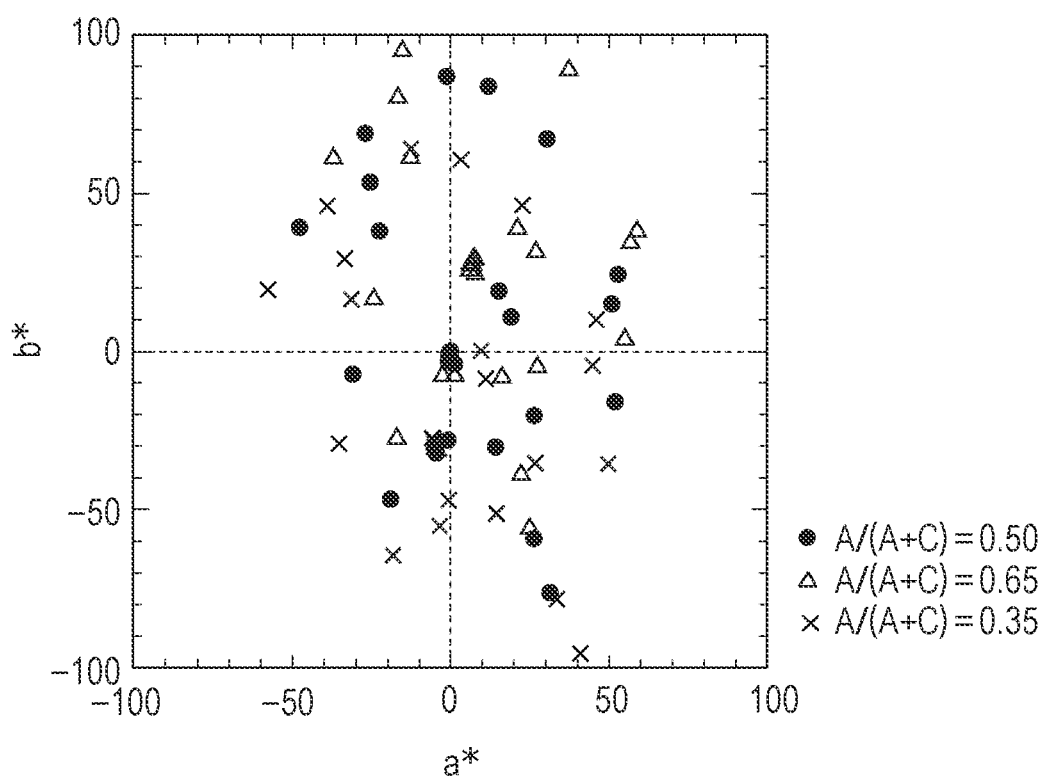

The change in color of an EC element having a variable transmittance VT(λ) in a colored state, the color being acquired by an image pickup element of a camera when the concentration ratio of the anodic EC compound is shifted, is shown in FIGS. 12A, 12B, and 12C in the same manner as in FIG. 10. FIGS. 12A, 12B, and 12C respectively show characteristics in the case where the EC elements of Examples 2, 3, and 4 are used, and FIGS. 12D and 12E respectively show characteristics in the case where the EC elements of Comparative Examples 2 and 3 are used. Comparison of FIGS. 12A to 12E shows that the EC elements of Examples, whose $R_{RGAC}$ is closer to 1, exhibit smaller gaps between the plots and a smaller color change, that is, a smaller degree of color unevenness. Among Examples 2, 3, and 4, Example 2, whose $R_{RGAC}$ is closer to 1, exhibits a smallest color change, and the color change increases as $R_{RGAC}$ moves away from 1 as can be seen from Examples 3 and 4. Here, the maximum value of the color change (color difference $\Delta E_{00}$) in Example 4 is 11.1, and that of Comparative Example 2 is 22.1. This confirms that when $R_{RGAC}$ is in the range of $0.59 \leq R_{RGAC} \leq 1.78$, the color difference can be within the Grade C color tolerance.

Example C: Control by Selection of EC Compounds

Construction of Variable Transmittance VT(λ)

An anodic EC compound obtained by combining the EC compounds 2 and 9 to 11 and a cathodic EC compound obtained by combining the EC compounds 8 and 12 to 14 are combined to construct variable transmittance spectra (VTA (λ) and VTC(λ)). Here, four are anodic compounds, and four are cathodic compounds. The total number of EC compounds used is eight. The detection light wavelength range of a photodetector used here was the range from 425 nm to 680 nm of a photodetector (image pickup element) illustrated in FIG. 5A. The EC compounds 11, 12, and 13 have a variable absorption spectrum peak in the R range of the photodetector, the EC compounds 8, 9, 10, and 14 in the G range of the photodetector, and the EC compounds 2 and 12 in the B range of the photodetector. Table 3 shows the concentration (mmol/L) in a light reduction state of the EC compounds of Examples and Comparative Examples and $R_{RGAC}$ calculated using a photodetector having a spectral sensitivity in FIG. 5A and, as a light source, natural light in the daytime having a spectrum shown in FIG. 6A (color temperature: 5600 K).

TABLE 3

| | Concentration in light reduction state/mM, $R_{RGAC}$ | |
|---|---|---|
| EC compound | Example 5 | Comparative Example 4 |
| Compound 2 | 39.1 | 0.0 |
| Compound 9 | 0.5 | 7.3 |

TABLE 3-continued

| | Concentration in light reduction state/mM, $R_{RGAC}$ | |
|---|---|---|
| EC compound | Example 5 | Comparative Example 4 |
| Compound 10 | 6.5 | 17.1 |
| Compound 11 | 45.9 | 7.8 |
| Compound 12 | 9.8 | 7.2 |
| Compound 8 | 14.4 | 9.6 |
| Compound 13 | 10.0 | 15.5 |
| Compound 14 | 33.1 | 0.0 |
| $R_{RGAC}$ | 0.99 | 2.14 |

Evaluation and Results

Figure 13A:
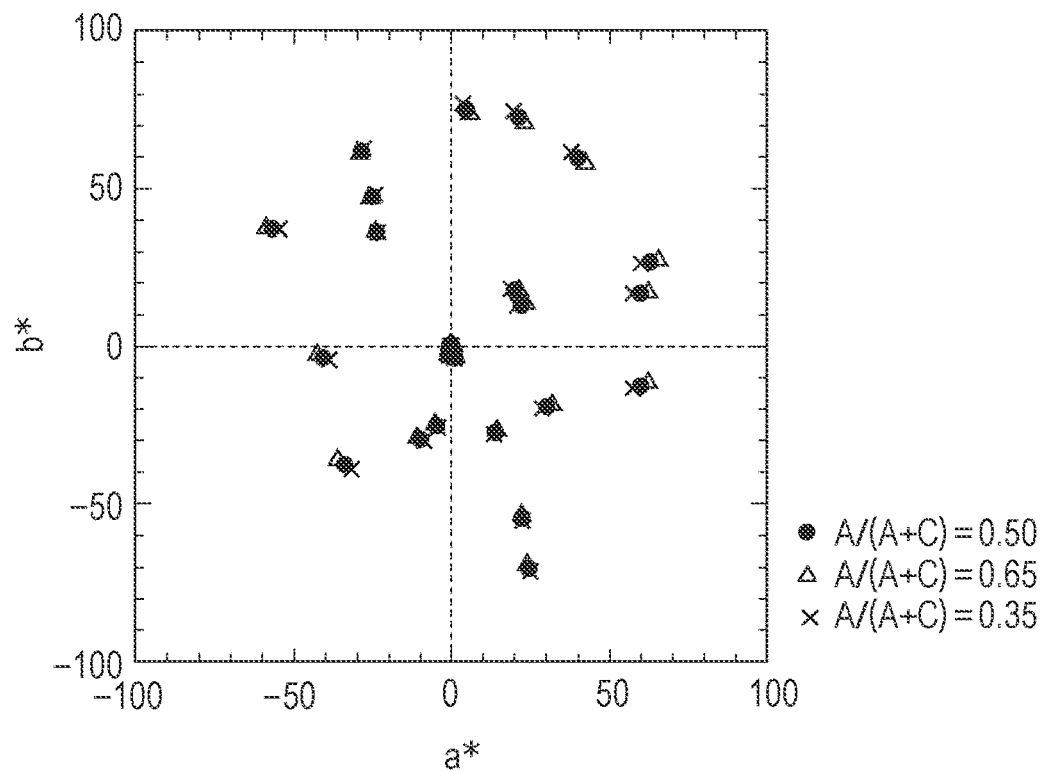
FIGS. 13A and 13B are graphs showing the influence of concentration unevenness of EC compounds on color in EC elements of Example and Comparative Example.
Figure 13B:
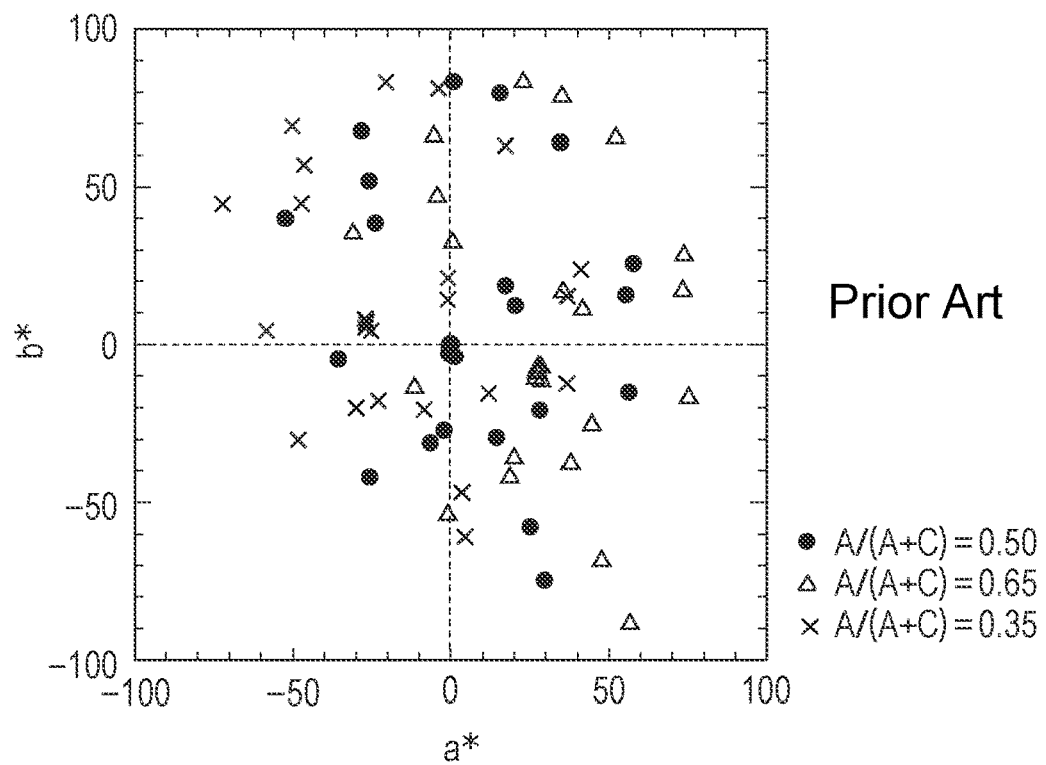

The change in color of an EC element having a variable transmittance VT(λ) in a colored state, the color being acquired by an image pickup element of a camera when the concentration ratio of the anodic EC compound is shifted, is shown in FIGS. 13A and 13B in the same manner as in FIG. 10. FIG. 13A show characteristics in the case where the EC element of Example 5 is used, and FIG. 13B show characteristics in the case where the EC element of Comparative Example 4 is used. Comparison of FIGS. 13A and 13B shows that the EC element of Example 5, whose $R_{RGAC}$ is closer to 1, exhibits smaller gaps between the plots and a smaller color change, that is, a smaller degree of color unevenness.

According to the present disclosure, an EC element with reduced color unevenness and an optical apparatus can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-130177, filed Jul. 12, 2019, which is hereby incorporated by reference herein in its entirety.

What is claimed is:

1. A camera system comprising:
a photodetector having a plurality of detection light wavelength ranges including red, green, and blue wavelengths; and
an electrochromic element which comprises:
a first electrode;
a second electrode; and
an electrochromic layer disposed between the first electrode and the second electrode, the electrochromic layer containing a solvent, an anodic electrochromic compound, and a cathodic electrochromic compound,
wherein when a variable transmittance of the anodic electrochromic compound is $VT_A(\lambda)$, and a variable transmittance of the cathodic electrochromic compound is $VT_C(\lambda)$, the variable transmittances being obtained by the photodetector when light is incident on the electrochromic element, wherein the incident light is daylight and/or from a light source with a color temperature between 1800K and 12000K, and among signal strengths based on the light passing through the electrochromic element and detection sensitivity, contributions of $VT_A(\lambda)$ in red and green wavelength ranges are $S_{RA}$ and $S_{GA}$, and contributions of $VT_C(\lambda)$ in the red and green wavelength ranges are SRC and SGC, $R_{RGAC}$ expressed as $R_{RGAC}=(S_{RA}/S_{GA})/(S_{RC}/S_{GC})$ satisfies $0.59 \leq R_{RGAC} \leq 1.30$, where $S_{RA}$, $S_{GA}$, $S_{RC}$ and $S_{GC}$ are represented by a following equation;

$$S_{RA}\int_{\lambda_0}^{\lambda_1} I_0(\lambda) VT_A(\lambda) D_R(\lambda) d\lambda, \ S_{RC}\int_{\lambda_0}^{\lambda_1} I_0(\lambda) VT_C(\lambda) D_R(\lambda) d\lambda$$

$$S_{GA}\int_{\lambda_0}^{\lambda_1} I_0(\lambda) VT_A(\lambda) D_G(\lambda) d\lambda, \ S_{GC}\int_{\lambda_0}^{\lambda_1} I_0(\lambda) VT_C(\lambda) D_G(\lambda) d\lambda$$

where $I_0(\lambda)$ represents a spectrum of the incident light, and each of $D_R(\lambda)$, $D_G(\lambda)$ represents a spectral sensitivity of the photodetector in a red wavelength range and a green wavelength range, respectively, and $\lambda_0$ represents a lower-limit wavelength in a detection light wavelength range of the photodetector, and $\lambda_1$ represents an upper-limit wavelength in the detection light wavelength range of the photodetector, and $VT_A(A)$ and $VT_C(A)$ are represented by a following equation;

$$VT(\lambda)=10^{-L\Sigma\Delta\varepsilon_n(\lambda)C_n} \quad \text{Formula (II)}$$

where L is an optical path length of the electrochromic element, $C_n$ is a concentration in a light reduction state, $\Delta\varepsilon_n(\lambda)$ is a changed absorption coefficient of the electrochromic compound, and wherein a detection spectrum of the photodetector has at least one of peaks in the each of 580 nm to 680 nm, 500 nm to 580 nm, and 425 nm to 500 nm wavelength ranges.

2. The camera system according to claim 1, wherein $R_{RGAC}$ satisfies $0.77 \leq R_{RGAC} \leq 1.30$.

3. The camera system according to claim 1, wherein $R_{RGAC}$ satisfies $0.88 \leq R_{RGAC} \leq 1.13$.

4. The camera system according to claim 1, wherein the anodic electrochromic compound and the cathodic electrochromic compound are low-molecular-weight organic compounds.

5. The camera system according to claim 1, wherein at least one of the anodic electrochromic compound or the cathodic electrochromic compound comprises a plurality of compounds.

6. The camera system according to claim 5, wherein the anodic electrochromic compound and the cathodic electrochromic compound each comprise a plurality of compounds.

7. The camera system according to claim 1, wherein the incident light is from the light source, and wherein the light source has a medium color temperature of 4000 K to 7000 K.

8. The camera system according to claim 7, wherein the light source has a color temperature of 5600 K.

9. The camera system according to claim 1, wherein a ratio of the amount of light transmitted through the electrochromic element in a transmission state to the amount of light transmitted through the electrochromic element in a light reduction state is 8 or more.

10. The camera system according to claim 1, wherein at least one of the anodic electrochromic compound and the cathodic electrochromic compound has a concentration of 0.05 mol/L or more.

11. The camera system according to claim 1,
wherein the detection spectrum of the photodetector has peaks in the each of 580 nm to 680 nm, 500 nm to 580 nm, and 425 nm to 500 nm wavelength ranges, and
wherein the peak in the range from 500 nm to 580 nm is larger than the peak in the range from 425 nm to 500 nm or the peak in the range from 580 nm to 680 nm.

12. The camera system according to claim 11,
wherein the peak in the range from 500 nm to 580 nm is larger than each of the peak in the range from 425 nm to 500 nm and the peak in the range from 580 to 680 nm.

* * * * *